(12) United States Patent
Durant et al.

(10) Patent No.: US 12,462,700 B2
(45) Date of Patent: Nov. 4, 2025

(54) SYSTEM AND METHOD FOR AIRCRAFT FLIGHT CONTROL

(71) Applicant: Satavia Limited, Cambridge (GB)

(72) Inventors: Adam Durant, Cambridge (GB); Antony Rix, Cambridge (GB); Dirk Simon, Cambridge (GB); Daniel Bannister, Cambridge (GB); Gregory Thompson, Longmont, CO (US)

(*) Notice: Subject to any disclaimer, the term of this patent is extended or adjusted under 35 U.S.C. 154(b) by 1096 days.

(21) Appl. No.: 17/275,324

(22) PCT Filed: Sep. 11, 2019

(86) PCT No.: PCT/IB2019/057657
§ 371 (c)(1),
(2) Date: Mar. 11, 2021

(87) PCT Pub. No.: WO2020/053785
PCT Pub. Date: Mar. 19, 2020

(65) Prior Publication Data
US 2022/0028287 A1   Jan. 27, 2022

(30) Foreign Application Priority Data
Sep. 11, 2018 (GB) .................................. 1814781

(51) Int. Cl.
*G08G 5/76*  (2025.01)
*B64D 15/22*  (2006.01)
(Continued)

(52) U.S. Cl.
CPC .............. *G08G 5/76* (2025.01); *B64D 15/22* (2013.01); *G01W 1/02* (2013.01); *G06N 7/01* (2023.01);
(Continued)

(58) Field of Classification Search
None
See application file for complete search history.

(56) References Cited

U.S. PATENT DOCUMENTS

| | | |
|---|---|---|
| 8,256,277 B2 | 9/2012 | Khibnik et al. |
| 8,275,499 B2 | 9/2012 | Coulmeau et al. |
| (Continued) | | |

FOREIGN PATENT DOCUMENTS

| | | |
|---|---|---|
| EP | 1700421 B1 | 4/2007 |
| EP | 2250763 B1 | 6/2011 |
| (Continued) | | |

OTHER PUBLICATIONS

Fossati et al. (Feb. 2013): Multiparameter Analysis of Aero-Icing Problems Using Proper Orthogonal Decomposition and Multidimensional Interpolation; McGill University, Montreal, Quebec H3A 2S6, Canada DOI: 10.2514/1.J051877 (Year: 2013).*

(Continued)

*Primary Examiner* — Abdhesh K Jha
(74) *Attorney, Agent, or Firm* — RC Trademark Company

(57) ABSTRACT

There is provided an aircraft flight control system comprising: a computing arrangement including an input interface and an output interface; wherein in operation the computing arrangement executes instructions to provide indications related to an estimated atmospheric contamination risk to at least one aircraft at selected locations and altitudes or pressures, by (i) receiving at least one aircraft flight plan data from the input interface; wherein at least one aircraft flight plan data includes at least one of time, a pressure or an altitude, a trajectory and a location representing at least one aircraft flight; (ii) determining the estimated atmospheric contamination risk using a measure of the at least one atmospheric contaminant for the at least one aircraft flight based upon a location, an altitude or pressure, a trajectory and a time information extracted from the at least one (Continued)

aircraft flight plan data; and (iii) providing, via the output interface, a resultant indication related to the estimated atmospheric contamination risk to the at least one aircraft.

17 Claims, 20 Drawing Sheets

(51) Int. Cl.
| | |
|---|---|
| *G01W 1/02* | (2006.01) |
| *G06N 7/01* | (2023.01) |
| *G06N 20/00* | (2019.01) |
| *G08G 5/34* | (2025.01) |
| *G01W 1/00* | (2006.01) |

(52) U.S. Cl.
CPC ............... *G06N 20/00* (2019.01); *G08G 5/34* (2025.01); *G01W 2001/003* (2013.01)

(56) References Cited

U.S. PATENT DOCUMENTS

| | | | |
|---|---|---|---|
| 8,285,427 | B2 | 10/2012 | Rogers et al. |
| 8,666,570 | B1 | 3/2014 | Tillotson |
| 8,681,021 | B1 | 3/2014 | Carrico |
| 8,723,686 | B1 | 5/2014 | Murray et al. |
| 9,718,562 | B1 | 8/2017 | Fisher et al. |
| 9,810,770 | B1 | 11/2017 | Weichbrod et al. |
| 2012/0215433 | A1 | 8/2012 | Subbu et al. |
| 2015/0336676 | A1 | 11/2015 | Mccan et al. |
| 2017/0286572 | A1 | 10/2017 | Hershey et al. |
| 2017/0323274 | A1 | 11/2017 | Johnson et al. |
| 2017/0323403 | A1 | 11/2017 | Johnson et al. |

FOREIGN PATENT DOCUMENTS

| | | |
|---|---|---|
| EP | 3200039 A1 | 8/2017 |
| EP | 3290342 A1 | 3/2018 |
| WO | 0236428 A2 | 5/2002 |
| WO | 2002036428 A2 | 5/2002 |
| WO | 2014106269 A1 | 7/2014 |

OTHER PUBLICATIONS

Communication pursuant to Article 94(3) EPC in EP Application No. EP19791364.3 on Feb. 3, 2022, 7 pages.

Durant et al., published "Daedalus—Enhanced Weather Threat Awareness for Aviation" in ESA Business Applications, on Aug. 31, 2015, 10 pages.

Jordan Mann, published "Cost of environmental factors for aviation" in Cost of environmental factors for aviation, on Aug. 24, 2017, 4 pages.

Combined Search and Examination Report under Sections 17 and 18(3) issued in GB Application No. GB1814781.9 on Oct. 22, 2018, 10 pages.

Notification of Transmittal of the International Search Report and Written Opinion of the International Searching Authority mailed in PCT Application No. PCT/IB2019/057657 on Nov. 15, 2019, 14 pages.

Notification Concerning Transmittal of International Preliminary Report on Patentability mailed in PCT Application No. PCT/IB2019/057657 on Mar. 25, 2021, 09 pages.

Tekla S.Perry published "Tracking weather's flight path" in IEEE Spectrum, in Sep. 2000, pp. 38-45.

Sérgio da Cruz Ribeiro published "Thesis on Implementation of an Engine Condition Monitoring tool for Airbus Aircraft" in Techno Lisboa in Jun. 2015, 102 pages.

\* cited by examiner

```
                    ┌─────┐
                    │  A  │
                    └──┬──┘
                       ▼
┌──────────────────────────────────────────────┐
│  USING THE MEASURE OF THE AT LEAST ONE       │
│  ATMOSPHERIC CONTAMINANT TO CALCULATE        │
│  AN ESTIMATE OF THE CONTAMINANT RISK TO AT   │──— 806
│  LEAST ONE AN AIRCRAFT FOR AT LEAST ONE      │
│  FLIGHT PLAN                                 │
└──────────────────────┬───────────────────────┘
                       ▼
┌──────────────────────────────────────────────┐
│  ADJUSTING AT LEAST ONE AIRCRAFT FLIGHT      │
│  PLAN TO ENSURE THE MEASURE OF               │──— 808
│  CONTAMINANT RISK IS BELOW A THRESHOLD       │
│  VALUE                                       │
└──────────────────────────────────────────────┘
```

FIG. 8B

SYSTEM AND METHOD FOR AIRCRAFT FLIGHT CONTROL

TECHNICAL FIELD

The present disclosure relates generally to systems that control, for example by way of recommendation, aircraft flight trajectories based on an estimated contamination risk. Moreover, the present disclosure relates to methods for (of) controlling, for example by way of recommendation, aircraft flight trajectories based on an estimated contamination risk. Furthermore, the methods advantageously employ machine learning techniques for determining an optimized aircraft flight plan based on an estimated contamination risk to aircrafts. The present disclosure also relates generally to a system that controls, for example by way of recommendation or technical status reporting, aircraft flight planning based on estimated ice water content risk; moreover, the present disclosure relates to a method for (of) planning the aircraft flight based on estimated ice water content risk. Moreover, the aforesaid system employs, when in operation, machine learning techniques for determining a risk of the aircraft flight's encounter with the ice water contents present in an atmosphere and for adjusting at least one trajectory of the aircraft based on the estimated ice water content risk. Furthermore, the present disclosure is concerned with computer program products comprising a non-transitory computer readable storage medium having computer-readable instructions stored thereon, the computer-readable instructions being executable by a computerized device comprising processing hardware to execute the aforesaid method.

BACKGROUND

Airborne environmental contaminants such as dust, ice, atmospheric aerosol particles and corrosive gases pose a hazard to aircrafts. The environmental contaminants accumulate inside aircraft bodies, aircraft wings, aircraft surfaces, aircraft control apparatus, aircraft undercarriage, aircraft ducts, aircraft instruments, aircraft engines and so forth; moreover, the environmental contaminants cause:
(i) wear or blockage to aircraft and engine;
(ii) clogged aircraft components as a result of the environmental contaminants adhering to surfaces; and
(iii) damage to protective surfaces, and corrosion to be induced.

Certain environmental contaminants potentially additionally or alternatively corrosively or abrasively attack such components. Such detrimental effects potentially damage at least one of the aircraft, systems, instruments and the engines of the aircrafts, thus reducing aircraft or engine life, and potentially even cause in-flight failures or incorrect performance or instrument readings, all with resulting cost impact and risk to human lives. It is therefore desirable to try to avoid exposure to such environmental contamination and also remove such contamination from aircraft before damage occurs; however, such removal, for example by way of washing of aircraft component parts, costs money and result in aircraft being grounded during such washing.

To assist aircraft in flight to avoid dangerous weather, some known methods pertain to how to communicate weather forecasts or reports from external sources to the aircraft, to detect weather events such as storms from on-board sensors or radar, and to arrange for aircraft to re-route to avoid potentially dangerous events. Common to this state of the art is an emphasis on basic weather parameters of temperature, precipitation and wind, and these known methods are used to avoid phenomena such as storms that could pose a danger to the aircraft as a whole. While these methods are of value, they do not address certain atmospheric effects that can cause engines, or other aircraft components such as instruments, wing surfaces, to clog with ice, and are not applied to other types of contaminants like dust.

A particular hazard relates to high altitude ice crystals. These can occur at altitudes where aircrafts typically cruise, in the region of 10,000 to 15,000 metres above sea level. If a given aircraft flies into a region of ice crystals, ice deposits potentially builds up inside the engines or instruments to the extent that it can block them. On account of all engines and instruments of a given aircraft being exposed to the same phenomena simultaneously, multiple failures can occur in the given aircraft, making ice deposits arising from ice crystals especially dangerous. High altitude ice are potentially found in short-lived or rapidly-moving atmospheric events, and potentially have particle sizes that are so small that radars cannot detect or distinguish them. In addition, an icing event can potentially occur around an aircraft that is already in flight, where detection by radar would then be too late to prevent exposure to the ice crystals.

With limited information, high costs are also potentially also incurred by cancelling or re-routing flights to avoid hazardous phenomena, for example in a vicinity of a departure or arrival airport. These costs are potentially avoidable if a more accurate estimate is available.

Therefore, in light of the foregoing discussion, there exists a need to overcome the aforementioned drawbacks in existing approaches for aircraft flight planning and adjusting the proposed aircraft flight plan considering the expected environment contaminant exposure.

Environmental contaminants such as ice, atmospheric aerosol particles and corrosive gases pose a hazard to aircrafts, as aforementioned. The environmental contaminants potentially accumulate inside aircraft engines and result in detrimental effects, for example causing wear or blockage, adhering to components thus clogging them, damaging protective surfaces, and inducing corrosion. Moreover, the environmental contaminants can potentially damage other parts of the aircraft, not only their engines, for example panel welds, panel rivets and seals.

An ice crystal icing envelope (also called an altitude-temperature plot), is a part of appendix P of a CS-25 certification. The CS-25 certification was originally designed to set certification standards for aircraft engines to operate in environments with high ice water contents. If a given aircraft operates within the ice crystal icing envelope, there is potentially a risk for the given aircraft to experience icing. The high ice water contents in the environments are hazardous, because the ice accretion into turbine engines potentially causes a thrust loss, and ice shedding into a compressor which causes the compressor to flameout. Over last few decades, many commercial aircrafts have reported, with respect to jet engines, power loss and turbine engine damage while flying through environments with relatively high ice water contents. The ice crystal icing envelope is the only tool currently available for a pilot or an airline or a flight dispatcher to assess a risk of exposure of the aircraft to the ice water contents.

Furthermore, the ice crystal icing envelope is based on a standard atmosphere (i.e. an adiabatic lapse defined by a convective rise of 90% relative to a humidity in an air from a sea level to a higher altitude and scaled by a factor of 0.65 to a standard cloud length of 17.4 nautical miles). Typically, an air column has different characteristics to the standard atmosphere which potentially leads to considerable uncertainty regarding a probability of the aircraft encountering the high ice water contents within or around the ice crystal icing envelope. No existing measurement or model is available to determine, for example, a concentration, an exposure, or a mean ice water content, and a safety operation of the aircraft through the environment. Furthermore, if the ice concentrations are high in the environment, the ice has a sufficient mass to overwhelm temporarily pitot tubes which potentially leads to instruments or parts of the aircraft freezing. Existing systems employ a feedback loop which may consequently lead to an incorrect placement of the aircraft outside the ice crystal icing envelope despite flying through hazardous environment conditions. Hence, a real-time (or a near real-time) information of an icing threat with respect to the ice crystal icing envelope is, therefore, vital for aircraft flight planning.

Existing known approaches identify the ice water content risk by at least one of:
 (a) using an anti-ice gear while flying into suspected icing conditions;
 (b) flying a shortest distance through a storm, and
 (c) using the ice crystal icing envelope.

Existing known anti-ice systems used on aircrafts have a gear that is not tested in atmospheric conditions, and therefore, the existing anti-ice systems do not change the aircraft's limitation of prohibiting flight into icing. The pilots may rely on meteorological charts which only provide a broad-scale synoptic meteorology and other pilot reports (PIREPS) which are subjective in terms of an original pilot's judgment and a potential impact on any other aircraft using the PIREPS to avoid a high ice water content region. Additionally, the lack of real-time data of ice water content limits a pilot's ability to predict how the high ice water content environments potentially changes through the environment and time.

As a result, the exposure of the aircraft to the high ice water contents is typically performed retrospectively. Ice water contents is not currently measured continuously on commercial aircrafts, hence high ice water contents information remains unknown during the flight. The current use of the ice crystal icing envelope is to indicate potential risk only. The ice crystal icing envelope provides assumptions about the atmosphere (i.e. ambient air temperature and pressure levels) and how the assumptions equate to the threat of icing. Diagnosing and forecasting threat avoidance is ambiguous and imperfect without employing high ice water detection methods.

Therefore, in light of the foregoing discussion that elucidates technical problems associated with known technology, there exists a need to overcome the aforementioned problems that are encountered in existing approaches for aircraft flight planning and adjusting a flight trajectory of the aircraft flight considering the expected ice water content exposure.

SUMMARY

An aim of the present disclosure is to provide an improved aircraft flight control system that is more effective at controlling flight trajectories to try to avoid atmospheric contaminant and icing events.

The present disclosure provides an aircraft flight control system comprising:
 a computing arrangement including an input interface and an output interface; wherein in operation the computing arrangement executes instructions to provide indications related to an estimated atmospheric contamination risk to at least one aircraft at selected locations and altitudes or pressures, by
  (i) receiving at least one aircraft flight plan data from the input interface; wherein at least one aircraft flight plan data includes at least one of time, a pressure or an altitude, a trajectory and a location representing at least one aircraft flight; and
  (ii) determining the estimated atmospheric contamination risk using a measure of the at least one atmospheric contaminant for the at least one aircraft flight based upon a location, an altitude or pressure, a trajectory and a time information extracted from the at least one aircraft flight plan data; and
  (iii) providing, via the output interface, a resultant indication related to the estimated atmospheric contamination risk to the at least one aircraft.

Optionally, in the aircraft flight control system, the computing arrangement incorporates a calculation of at least one of spatial or temporal uncertainty to derive the indication related to the estimated atmospheric contamination risk.

Optionally, the computing arrangement employs machine learning utilizing one or more adaptive algorithms, wherein the one or more adaptive algorithms are trained using historical data pertaining to one or more aircraft or one or more aircraft engines.

Optionally, at least one contaminant risk or value is determined using a statistical or machine learning model applied to values of a contaminant determined from at least one of: a database, a web API, a NWP model, a measurement.

Optionally, at least one contaminant risk or value is determined using a statistical or machine learning model arranged to compensate for bias or spatial or temporal uncertainty in values of a contaminant determined from at least one of: a database, a web API, a NWP model, a measurement. It will be appreciated that "a web API" may be an application interface for data retrieval, including an interface making use of Internet protocols, or a similar communicative interface.

Optionally, a measure of spatial or temporal uncertainty is determined using a statistical or machine learning model arranged to receive values of a contaminant determined from at least one of: a database, a web API, a NWP model, a measurement.

The present disclosure also provides a method of aircraft flight control, characterized in that the method comprises:
 providing a measure of at least one atmospheric contaminant with respect to a location, an altitude or a pressure, and a time;
 receiving at least one aircraft flight plan data including at least one of a time, a pressure or an altitude, a trajectory and a location representing at least one aircraft flight;
 calculating an estimate of the atmospheric contaminant risk for at least one flight plan using the measure of at least one atmospheric contaminant based upon a location, an altitude or pressure, a trajectory and a time information extracted from the at least one aircraft flight plan data; and
 providing a resultant indication related to the estimate of atmospheric contamination risk to the at least one aircraft.

Optionally, the method utilizes a calculation of at least one of spatial or temporal uncertainty to derive the indication related to the estimated atmospheric contamination risk.

Optionally, the method employs machine learning utilizing one or more adaptive algorithms, wherein the one or more adaptive algorithms are trained using historical data pertaining to one or more aircraft or one or more aircraft engines.

Optionally, the method includes determining at least one contaminant risk or value by using a statistical or machine learning model applied to values of a contaminant determined from at least one of: a database, a web API, a NWP model, a measurement. It will be appreciated that "a web API" may be an application interface for data retrieval, including an interface making use of Internet protocols, or a similar communicative interface.

Optionally, the method includes determining at least one contaminant risk or value by using a statistical or machine learning model arranged to compensate for bias or spatial or temporal uncertainty in values of a contaminant determined from at least one of: a database, a web API, a NWP model, a measurement.

Optionally, the method includes determining a measure of spatial or temporal uncertainty by using a statistical or machine learning model arranged to receive values of a contaminant determined from at least one of: a database, a web API, a NWP model, a measurement.

The invention is of advantage in that the computing arrangement is able to provide an improved assessment of spatial contamination or icing distribution along various potential flight trajectories and therefore controlling a selected trajectory of the aircraft to reduce an exposure to such spatial contamination or icing distribution.

It will be appreciated that the aforesaid present method is not merely a "method of doing a mental act", but has technical effect in that the method functions as a form of technical control using machine learning or statistical analysis of a technical artificially intelligent system. The method involves providing an atmospheric model to solve the technical problem of optimizing aircraft flight planning using the measure of at least one atmospheric contaminant.

Moreover, it will be appreciated that patent authorities (for example the UKIPO and the EPO) regularly grant patent rights for data encoders, wherein input data to the encoders is often of an abstract nature (for example computer generated graphics) and encoding merely amounts to rearranging bits present in the input data, namely merely causing a change in data entropy (see for example, MPEG encoders, JPEG encoders, H. 264 type encoders and decoders). Moreover, the EPO has granted patent rights merely for methods of analyzing networks and producing graphical representations of the networks (for example, see EP2250763B1 ("Arrangements for networks", Canright et al.), validated in the United Kingdom) (for example, see EP1700421B1 ("A method of managing networks by analyzing connectivity", Canright et al.), also validated in the United Kingdom), wherein the patent rights have been validated in respect of the UK. Thus, to consider the method of the present disclosure to be subject matter that is excluded from patentability would be totally inconsistent with EPO and UKIPO practice in respect of inventions that are technically closely related to embodiments described in the present disclosure.

The present disclosure also provides a computer program product comprising instructions to cause the system to carry out the above method.

According to another aspect, there is provided an aircraft anti-icing system, comprising:
  a computing arrangement including at least one input interface, a processor and at least one output interface; and
  an anti-icing apparatus communicatively coupled to the output interface;
  wherein the input interface is adapted to receive an ice water content data value, and to transmit the ice water content data value to the processor, and
  wherein the processor is adapted to compare the ice water content data value to a minimum threshold value in order to determine if the ice water content data value is above the minimum threshold value, and to turn the anti-icing apparatus on when it is determined that the ice water content data value is above the minimum threshold value, and to turn the anti-icing apparatus off when it is determined that the ice water content data value is below the minimum threshold value.

The aircraft anti-icing system is optionally employed in combination with the aforementioned aircraft flight control system. Alternatively, the aircraft anti-icing system can be used independently of the aircraft flight control system. Operating the ant-icing apparatus is expensive in terms of energy consumption and wear-and-tear, so selective use of the anti-icing apparatus pursuant to the present disclosure is especially beneficial to conserve energy.

Optionally, in the aircraft anti-icing system, the input interface is adapted to receive ice water data values from onboard aircraft sensors or ground-based sensors, or both. Optionally, machine learning algorithms are applied to ensure that the ice water data values are more accurately representative of real physical conditions, for example using machine learning from past historical data. Thus, optionally, in the aircraft anti-icing system, the processor is adapted to perform machine learning on a historical ice water content data set in order to determine the minimum threshold value and when to turn the anti-icing apparatus on and off.

Optionally, in the aircraft anti-icing system, the interface is adapted to receive modelled ice water data values from an onboard data store, or from a wireless communication system.

Optionally, in the aircraft anti-icing system, the processor is adapted to generate a time-averaged ice water content value, and to determine when the time-averaged ice water content value ice water is above the minimum threshold value, and to turn the anti-icing apparatus on and off at a duty-cycle between 0% and 100% depending on the level of the time-averaged ice water content value.

Optionally, the anti-icing apparatus comprises either a window heating device, a power test probe heater, an airfoil heater, a fuel vent heater, a fluid surface de-icer, or an engine anti-icing device.

Optionally, the aircraft anti-icing system comprising an indicator of anti-icing apparatus status, wherein the indicator is communicatively coupled to the processor.

Optionally, in the aircraft anti-icing system, the processor is adapted determine a total time that the anti-icing is expected to be on along a first flight path of the aircraft, and to generate a second flight path when it is determined that the total time is above a minimum threshold time.

According to another aspect, there is provided a method of operating an aircraft anti-icing system, using a computer arrangement comprising an input interface, a processor and an output interface coupled to an anti-icing apparatus, the method comprising:
  receiving an ice water content data value;
  determining whether the received ice water content data value is above a minimum threshold value; and
  turning on the anti-icing apparatus when it is determined that the received ice water content data value is above the minimum threshold value.

The method of operating an aircraft anti-icing system is optionally employed in combination with the aforementioned aircraft flight control system. Alternatively, the method of operating an aircraft anti-icing system can be used independently of the aircraft flight control system. Operating the ant-icing apparatus is expensive in terms of energy consumption and wear-and-tear, so selective use of the anti-icing apparatus pursuant to the present disclosure is especially beneficial to conserve energy.

Optionally, the method includes receiving the ice water content data value from an onboard aircraft sensor and/or a ground-based sensor.

Optionally, the method includes receiving the ice water content data value from an atmospheric model.

Optionally, the method includes:
generating a time-averaged ice water content value,
determining when the time-averaged ice water content value ice water is above the minimum threshold value, and
turning the anti-icing apparatus on and off at a duty-cycle between 0% and 100% depending on the level of the time-averaged ice water content value.

Optionally, the method includes:
providing a historical ice water content data set,
determining the minimum threshold value using a machine learning technique,
comparing the received ice water content data value to the minimum threshold value, and
turning the anti-icing apparatus on when it is determined that the received ice water content data value is above the minimum threshold value.

Optionally, the method includes:
receiving a first flight path for the aircraft,
determining a total time that the anti-icing apparatus is expected to be on along the first path, and
generating a second flight path when it is determined that the total time is above a threshold time value.

Optionally, the method includes providing a recommendation to a personnel of an aircraft to selectively switch-on or switch-off the anti-icing apparatus, wherein the personnel act on the recommendation to control the anti-icing apparatus as a part of an intelligent feedback control loop.

The ant-icing apparatus, when in operation, is capable of providing the following indications:
(i) a positive indication that anti-ice apparatus should be used due to the presence of a risk of icing;
(ii) a negative indication that anti-ice apparatus does not need to be used due to low risk of icing;
(iii) providing an indication or recommendation of positive or negative control of an anti-ice apparatus in the circumstances above for (i) and (ii).

It will be appreciated that the CS25 curve does not take into account atmospheric ice water content because it relies only on temperature and altitude. As a result, it is difficult to sense ice water content and radar is not capable of sensing such content reliably. Simple forecasts and NWP models do not take spatial or temporal uncertainty into account. The de-icing apparatus and associated method of the present disclosure addresses these issues by more accurately identifying risk of atmospheric ice water content.

Embodiments of the present disclosure substantially eliminate or at least partially address the aforementioned drawbacks in existing approaches for aircraft flight planning and adjusting the proposed aircraft flight plan considering the expected environment contaminant exposure.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 8A to 8B are a flow diagram that illustrates a method for (of) controlling aircraft flight according to an embodiment of the present disclosure;

Figure 1:
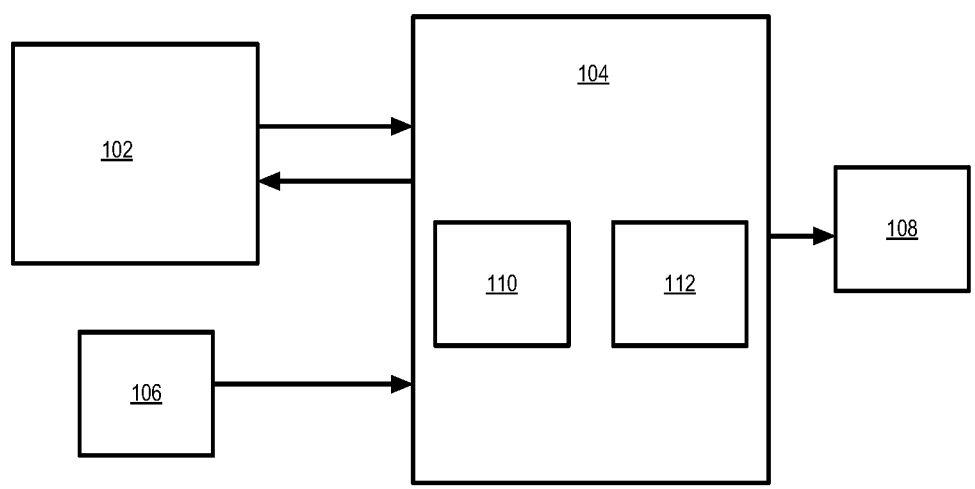
FIG. 1 is a schematic illustration of a system according to an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides an aircraft flight control system comprising:
a computing arrangement including an input interface and an output interface; wherein in operation the computing arrangement executes instructions to provide indications related to an estimated atmospheric contamination risk to at least one aircraft at selected locations and altitudes or pressures, by
  (i) receiving at least one aircraft flight plan data from the input interface; wherein at least one aircraft flight plan data includes at least one of time, a pressure or an altitude, a trajectory and a location representing at least one aircraft flight; and
  (ii) determining the estimated atmospheric contamination risk using a measure of the at least one atmospheric contaminant for the at least one aircraft flight based upon a location, an altitude or pressure, a trajectory and a time information extracted from the at least one aircraft flight plan data; and
  (iii) providing, via the output interface, a resultant indication related to the estimated atmospheric contamination risk to the at least one aircraft.

Optionally, when in operation, the computing arrangement incorporates a calculation of at least one of spatial or temporal uncertainty to derive the indication related to the estimated atmospheric contamination risk.

The present system thus helps to reduce or mitigate a risk of contaminant exposure to a given aircraft by adjusting aircraft flight control when selecting a suitable aircraft trajectory. The present system thus allows operators to determine, before an aircraft takes off, whether or not it may be appropriate to alter the service (for example, to cancel, delay or re-route a flight) to avoid a hazard. The present system thus permits operators or automated systems to determine possible changes to a given aircraft flight path, height or speed when an aircraft is in flight, to avoid or reduce a risk of encountering a hazard.

In an embodiment, the flight plan includes takeoff and landing airports and a trajectory defined by list of waypoints defined by expected time parameters, latitude parameters, longitude parameters, altitude parameters.

In another embodiment, where only the takeoff and landing airports are provided, a trajectory is susceptible to being estimated using methods known in the art, for example by preparing a typical trajectory between the two airports representative of one or more previous paths taken by an aircraft. A trajectory optionally also comprises only one point or a sequence of points representing a part of a flight path of interest, for example to traverse a region known to be subject to adverse weather. In such an example, the system processes to determine a risk only for the provided subset trajectory.

In an embodiment, where time parameters are not otherwise provided, time is determinable from the scheduled departure or arrival time of a flight.

In another embodiment, where only one time parameter is provided, times of each waypoints is determinable iteratively from another known waypoint in turn by dividing the distance between the two waypoints by the aircraft's typical speed during that part of the flight.

It will be appreciated that waypoints are known on a similar grid to a numerical weather prediction (NWP) model, where waypoints are widely separated and they are susceptible to being interpolated or extrapolated, for an example on a straight-line basis, so that spatial locations are sampled with a resolution approximating to that of the NWP model.

The input interface beneficially obtains aircraft flight data and boundary condition data from a cloud-based server. The input interface optionally obtains the aircraft flight data and the boundary condition data from a sensor device, a user device or a radar device. The information related to the modified aircraft plan is provided to an operating personnel. The information related to the modified aircraft plan is optionally utilized by the automated system. The output interface beneficially shows/displays the modified aircraft plan to the operating personnel through the user device.

The first storage medium, the input interface, the output interface are communicatively coupled with the control module over a communication network. The input interface is communicatively coupled with the client-server, the sensor device, the user device and the radar device over a communication network. The cloud-based server is optionally a tablet computer, a desktop computer, a personal computer or an electronic notebook computer. The communication network is optionally a wired network or a wireless network, or a combination of a wired network and a wireless network.

In an embodiment, the measure of the at least one atmospheric contaminant is calculated for at least one time instant by a regression model or a statistical model or by employing a machine learning model. The regression model or the statistical model or the machine learning model is beneficially trained and optimized using a historical atmospheric contaminant data or live atmospheric contaminant data to predict values, probabilities, variances or other measures of the distribution or a risk of the hazard ahead of time. The regression model or the statistical model or the machine learning model is beneficially trained and optimized with a simulation of the atmospheric contamination risk data. The regression model or the statistical model or the machine learning model is optionally a Monte-Carlo simulation model that is used to generate multiple model outputs and thereby derive an estimated probability, expectation or standard deviation, that the hazard is potentially present at some time in the future. By "machine learning" is meant software products that are executable on computing hardware to implement one or more algorithms, wherein the algorithms are adaptably self-modifying in response to data being processed via use of the algorithms. For example, the algorithms optionally include explicit functions such as regression of data, extrapolation of data, correlation of data, aggregation of data, and similar.

In another embodiment, a measure of the high-altitude ice (HAI) for the at least one aircraft flight is calculated by a regression model or a statistical model or a machine learning model. The regression model or the statistical model or the machine learning model is beneficially trained and optimized using historical high-altitude ice (HAI) and at least one flight trajectory to determine the risk of the at least one aircraft flight's encounter with the high-altitude ice (HAI) ahead of time. The regression model or the statistical model or the machine learning model is beneficially trained and optimized with a simulation of the datasets. The regression model or the statistical model or the machine learning model is optionally a Monte-Carlo simulation model used to generate multiple model outputs and thereby derive an estimated probability, expectation or standard deviation, that the hazard is potentially present at some time in the future. As aforementioned, it will be appreciated that "machine learning" relates to one or more software products that are executable on computing hardware, wherein the one or more software products are operable to amend the one or more software products in an adaptive manner, for example via amendments to operating parameters of the one or more software products (for example parameters defining interconnections within neural networks having one or more feedback paths therein) in response to data that is processed through the computing hardware.

In an embodiment, the machine learning comprises at least one of: linear regression, neural network, decision tree, decision forest or gradient boosted decision tree, radial basis function, support vector machine, Gaussian process, or principal component analysis.

The machine learning may include at least one of time within a year and/or time of day as regression parameters.

In an embodiment, the regression model or the statistical model or the machine learning model, or a threshold-based calculation from the regression model or the statistical model or the machine learning model outputs, optionally additionally or alternatively determines whether or not a given hazard is present, or an approximate likelihood or a probability that the hazard is potentially present.

According to an embodiment, the computing arrangement further comprises a database of at least one of aircraft flight plan variables or air traffic constraints, wherein in operation the computing arrangement calculates at least one modified aircraft flight plan for the at least one aircraft flight based on at least one of aircraft flight plan variables or air traffic constraints, and generates an estimated atmospheric contamination risk for the modified aircraft flight plan for comparison with the estimated atmospheric contamination risk of at least one aircraft flight plan.

In an embodiment, a NWP model is employed that is arranged to compute a concentration or a mixing ratio of the contaminant at a plurality of locations, heights and times in proximity to the flight, using methods such as the WRF and ECMWF models. These models are known, but are employed in a novel manner in embodiments of the present disclosure.

In another embodiment, at one or more waypoints, the computing arrangement determines an estimate of atmospheric contaminant risk by querying the results of an NWP model for a particular location, time and height to determine the concentration of a contaminant. For example, the NWP model defines the concentration or mixing ratio of ice water, dust, sulphate, sulphur dioxide or sodium chloride.

In an example embodiment, the NWP model defines the mixing ratio (for example, in kg of contaminant per kg of air). Moreover, the concentration is optionally derived by multiplying the mixing ratio by the density of air at the temperature and pressure estimated at the respective location, time and height.

In an embodiment, the location, height or time in the NWP model do not correspond exactly to the waypoint. The closest location, height or time are optionally determined and used to query the NWP model results.

In an embodiment, the interpolation such as linear or bicubic interpolation is optionally used to interpolate the NWP model derived mixing ratio or concentration at the waypoint.

In an embodiment, the system calculates more than one modified aircraft flight plan, estimates atmospheric contamination risk associated with more than one modified aircraft flight plan and compares contamination risk associated with more than one modified aircraft flight plan. The lower contamination risk associated with modified aircraft flight plan is recommended to the operating personnel or automatically adopted by the system.

According to an embodiment, the resultant indication related to the estimated atmospheric contamination risk provided via the output interface comprises at least one of: an index of the risk or atmospheric contamination associated with an aircraft flight; a recommendation on modification of at least one aircraft flight plan to mitigate or reduce atmospheric contamination exposure; an indication of portions of the aircraft flight where risk or exposure exceeds a threshold.

The index of the risk or contamination associated with an aircraft flight comprises an expected concentration of a contamination to an aircraft, or a probability of the hazard being present in material quantity, at a plurality of locations; heights, pressures or model levels; and times in the future. The recommendation on modification of at least one aircraft flight plan comprises canceling the aircraft flight, rerouting or delaying the aircraft flight. The recommendation on modification of at least one aircraft flight plan provides a number of alternate trajectories through different regions at slightly different times as part of the aircraft flight plan.

From the estimated aircraft flight plan or trajectory, expected location (e.g. latitude and longitude or similar map location), speed and height of an aircraft may be determined at a number of time points.

In an embodiment, the estimated concentration of a contaminant is optionally used directly as a measure of the risk. For example, it is known that high-altitude ice (HAI) poses a particular hazard to aircraft, therefore the estimated concentration of high-altitude ice (HAI) is optionally presented as the risk.

In an embodiment, the threshold is optionally applied to determine the risk. For example, if high-altitude ice (HAI) exceeds 1 gram per cubic metre, it is potentially considered to pose an unacceptable hazard and therefore will be highlighted as the risk.

In another embodiment, a pre-determined relationship is used to relate the concentration of the contaminant to the risk. For example, at 0.1 g/m3 the risk is 10%, at 1.0 g/m3 the risk is 30%, and at 3 g/m3 the risk is 100%. Moreover, at least one intermediate risk value is determinable by employing interpolation.

In an embodiment, the system optimizes the recommendation by applying aircraft routing and computer technology known in the art, given at least one candidate trajectory, to identify modifications to a trajectory. The modifications to the trajectory minimize a measure of the hazard such as its mean square, preferably in combination with minimizing at least one other cost metric such as flight duration and/or fuel consumption and/or maximizing separation from airborne hazards such as a position of other aircraft at the corresponding time. By applying or iterating such methods, a candidate trajectory is recommended with a lower risk of the hazard than the original trajectory.

In an embodiment, a candidate trajectory or alternate flight plan is beneficially presented to an operator, pilot and/or air traffic control for approval, or is beneficially automatically adopted or communicated to an aircraft.

According to an embodiment, in operation the input interface and the output interface computes information to be provided to the aircraft flight planning system.

According to an embodiment, further variables are received by the input interface and utilized by the computing arrangement to iterate the measure of at least one atmospheric contaminant with the further variables to provide estimated atmospheric contamination risk; wherein said further variables including one or more of: engine or aircraft control, loading or operational parameters, engine or aircraft model and type information, sensor data, weather parameters, temperatures, speeds, altitudes, mass flow rates, fuel flow rates, vibration measures, inspection results and wear estimates; and wherein the measure of at least one atmospheric contaminant is iterated by defining at least one boundary condition which represents at least one of a weather or atmospheric contaminant at a time.

In an embodiment, the system optimizes the recommendation on modification of at least one aircraft plan also considering further variables received from the input interface.

In an embodiment, the measure of the at least one atmospheric contaminant is calculated for at least one time instant by running a specially configured atmospheric model such as Weather Prediction Model (Weather Research and Forecasting) using boundary conditions (for example, dust boundary data) for predicting estimated contamination, and the output is an estimate of weather, water, and contaminates by locations, altitudes and time. The system may produce three-dimensional (3D) matrix for each contaminant separately and add them to obtain four-dimensional (4D) weather model using time.

According to an embodiment, in operation the computing arrangement incorporates at least one of spatial or temporal uncertainty calculation to the indication related to the estimated atmospheric contamination risk.

In an embodiment, uncertainty in future movement of air due to wind may be represented with a standard deviation in units of distance, and a kernel function such as a radial Gaussian with a radius proportional to such standard deviation is beneficially applied to a matrix of hazard probability estimates to derive a spatially smoothed probability. Preferably, the uncertainty estimation uses an approximation to Bayes' Theorem.

In an embodiment, a measure of spatial or temporal uncertainty is calculated or derived for the waypoint or closest NWP result location. The measure of uncertainty is susceptible to being estimated by the NWP model by Monte Carlo modelling method. A measure of uncertainty is optionally a value for the particular waypoint or location, or is beneficially averaged or smoothed over regions, heights or times, for example by using a Gaussian convolution, to reflect that the estimation of the measure of uncertainty is potentially itself stochastically noisy.

In an embodiment, a probability density function is determined which is representative of the concentration or mixing ratio. The comparison between the probably density function, an estimated concentration and uncertainty is used to determine at least one risk. For example, given an estimated HAI, a standard deviation from the estimate is determined using the measure of spatial or temporal uncertainty, wherein the estimation error is considered to follow a normal distribution. The probability that atmospheric contaminant concentration at a location exceeds a threshold is determined and used as the risk.

For example, the contaminant concentration exceeding 1 g/m3 is presented as the risk at the output interface for the respective location or waypoint.

In an embodiment, the NWP models potentially make errors in locating an event such as a storm or dust storm in space or time. Methods known in the art of NWP exist to estimate the magnitude of such errors, for example by estimating cloud visibility as seen from space and comparison with satellite images of corresponding events.

The spatial or temporal uncertainty potentially varies over time or location.

In an embodiment, the spatial or temporal uncertainty are related, as known in the art of Kalman filtering, and thus beneficially interchangeable, for example by considering the speed of movement of a weather event or the underlying wind speed.

In an embodiment, the spatial uncertainty is optionally defined by at least one standard deviation. By multiplying a Gaussian function with the spatial uncertainty, the spatial uncertainty is beneficially converted to a probability density function sampled over space representative of a spatial normal distribution.

In an embodiment, spatial or temporal uncertainty is defined over a region (optionally, by a probability density function), and a contaminant's uncertainty or distribution is estimated at a location. For example, the NWP results over the region is considered as an ensemble of samples (optionally, with likelihood determined from the probability density function). The proportion of samples exceeding at least one threshold is optionally considered to approximate the risk (optionally, weighted using the probability density function), providing a beneficial method to estimate the risk, as the probability, that the contaminant exceeds each threshold in the approximate location.

According to an embodiment, the system comprises a distributed computing system, and wherein the computing arrangement is centralised with the input interface and/or the output interface are provided at local nodes.

According to an embodiment, at least contaminant comprises one or more of: atmospheric ice crystals, dust, organic particles, volcanic ash, salt, sulphur dioxide and sulphate ions.

The present disclosure also provides a method of aircraft flight control, the method comprising:
  providing a measure of at least one atmospheric contaminant with respect to a location, an altitude or a pressure, and a time;
  receiving at least one aircraft flight plan data including at least one of a time, a pressure or an altitude, a trajectory and a location representing at least one aircraft flight;
  calculating an estimate of the atmospheric contaminant risk for at least one flight plan using the measure of at least one atmospheric contaminant based upon a location, an altitude or pressure, a trajectory and a time information extracted from the at least one aircraft flight plan; and
  providing a resultant indication related to the estimate of atmospheric contamination risk to the at least one aircraft.

Optionally, the method utilizes a calculation of at least one of spatial or temporal uncertainty to derive the indication related to the estimated atmospheric contamination risk.

It will be appreciated that the aforesaid present method is not merely a "method of doing a mental act", but has technical effect in that the method functions as a form of technical control using machine learning or statistical analysis of a technical artificially intelligent system. The method involves providing an atmospheric model to solve the technical problem of optimizing aircraft flight planning using the measure of at least one atmospheric contaminant.

According to an embodiment, the method further comprises adjusting at least one aircraft flight plan to ensure the measure of atmospheric contaminant risk is below a threshold value.

According to an embodiment, the measure of the at least one atmospheric contaminant is calculated by a statistical, regression model or machine learning model utilising at least one of historical or live atmospheric contaminant data.

According to an embodiment, the statistical or machine learning model is calibrated, trained or optimised using at least one of historical atmospheric contaminant data, live atmospheric contaminant data or simulations of the atmospheric contaminant risk.

According to yet another embodiment, the method further comprises using the measure of at least one atmospheric contaminant to calculate at least one estimate of the atmospheric contaminant measure in the vicinity of a modified flight plan and the step of adjusting the flight plan further comprises performing a comparison of a plurality of estimated atmospheric contamination risk associated with each of the modified flight plan and flight plan.

According to yet another embodiment, at least one contaminant comprises high-altitude ice (HAI) and the estimated contaminant risk comprises a probability of the presence of the high-altitude ice (HAI).

According to yet another embodiment, the at least one atmospheric contaminant comprises one or more of: dust, organic particles, volcanic ash, salt, sulphur dioxide and sulphate ions; and the estimated atmospheric contaminant risk comprises an exposure index indicative of the concentration or an amount of atmospheric contaminants estimated to have passed through the aircraft engines.

According to yet another embodiment, the exposure index comprises a weighted total exposure to a plurality of atmospheric contaminants.

According to yet another embodiment, the method further comprises providing air traffic constraints to the flight plan prior to the step of adjusting the flight plan.

According to yet another embodiment, the method is performed as a Monte Carlo model to provide a probability, expectation or standard deviation for the forecast of the atmospheric contaminant risk.

According to yet another embodiment, the method further comprises providing at least one of current or forecasted weather information to the measure of the at least one atmospheric contaminant and adjusting the estimated atmospheric contaminant risk accordingly.

According to yet another embodiment, the method further comprises the method further comprises post-processing the estimated atmospheric contaminant risk to apply at least one of a spatial and/or temporal uncertainty calculation.

According to yet another embodiment, the post-processing comprises deriving a spatially smoothed probability.

According to yet another embodiment, the post-processing comprises applying an approximation to Bayes' theorem.

According to yet another embodiment, the method further comprises applying an optimization to reduce the atmospheric contamination risk versus at least one cost metric associated with alternate flight plan.

According to yet another embodiment, the method further comprises outputting providing at least one adjusted flight plan for user approval.

The advantages of the present method are thus identical to those disclosed above in connection with the present system and the embodiments listed above in connection with the system apply mutatis mutandis to the method.

The present disclosure also provides a computer program product comprising instructions to cause the system to carry out the above method.

The advantages of the present computer program product are thus identical to those disclosed above in connection with the present system and the embodiments listed above in connection with the present system apply mutatis mutandis to the computer program product.

The phrase flight plan as used herein generally refers to the route of a flight and/or flight plan data.

In another aspect, according to the present disclosure, there is provided an aircraft flight control system comprising:
  a first storage medium comprising a measure of at least one atmospheric contaminant with respect to a location, an altitude or a pressure, and a time;
  a control module in communication with the first storage medium, the control module having a processor and a memory containing executable instructions to provide indications related to an estimated atmospheric contamination risk to at least one aircraft at selected locations and altitudes or pressures;
  an input interface in communication with the control module for receiving at least one aircraft flight plan data including at least one of time, a pressure or an altitude, a trajectory and a location representing at least one aircraft flight; and an output interface in communication with the control module for providing indications related to an estimated atmospheric contamination risk to the at least one aircraft, wherein the control module
    receives at least one aircraft flight plan data from the input interface;
    determines an estimated atmospheric contamination risk using the measure of the at least one atmospheric contaminant for the at least one aircraft flight based upon a location, an altitude or pressure, a trajectory and a time information extracted from the at least one aircraft flight plan data; and
    provides a resultant indication related to the estimated atmospheric contamination risk of the at least one aircraft to the output interface.

According to an embodiment, the system further comprises a second storage medium in communication with the control module containing a database of at least one of aircraft flight plan variables or air traffic constraints, wherein the control module interrogates the second storage medium and calculates at least one modified aircraft flight plan for the at least one aircraft flight, an estimated atmospheric contamination risk for the modified aircraft flight plan being generated for comparison with the estimated atmospheric contamination for at least one aircraft flight plan.

In another aspect, according to the present disclosure, it is provided a method of aircraft flight planning, the method comprising:
    providing a measure of at least one atmospheric contaminant with respect to a location, an altitude or a pressure, and a time;
    receiving at least one aircraft flight plan data including at least one of a time, a pressure or an altitude, a trajectory and a location representing at least one aircraft flight;
    using the measure of the at least one atmospheric contaminant to calculate an estimate of the atmospheric contaminant risk to at least one an aircraft for at least one flight plan; and adjusting at least one aircraft flight plan to ensure the measure of atmospheric contaminant risk is below a threshold value.

The aforementioned aircraft flight control system in beneficially employed in combination with an aircraft flight planning system; beneficially, the aircraft flight planning system comprises:
    a computing arrangement that executes instructions when in operation to generate a weather prediction model,
    wherein at least one storage medium is coupled to the computing arrangement and includes datasets of ice water contents present in an atmosphere, wherein the datasets of ice water contents comprise information on the ice water contents with respect to a latitude, a longitude, an elevation, and a time,
    at least one input interface that receives when in operation at least one aircraft flight plan data including at least one of a time, a pressure, an altitude, a trajectory or a location representing at least one aircraft flight; and
    at least one output interface that provides a risk prediction or a status report (or both) of the aircraft flight's encounter with the ice water contents to a user;
    wherein the computing arrangement receives the at least one aircraft flight plan data and interrogates the datasets of ice water contents to
        determine at least one measure of historical ice water contents for a set of training data by retrieving datasets of atmospheric ice water contents at a location, an altitude and a time in proximity to at least one trajectory of the at least one aircraft flight in the aircraft flight plan data; and
        provide the historical ice water contents and the at least one flight trajectory as inputs for use in the weather prediction model,
    wherein the computing arrangement uses the weather prediction model and the inputs to
        determine a measure of ice water contents for the at least one aircraft flight in real-time by retrieving the datasets of ice water contents of at least one of a time, a pressure, an altitude, a trajectory or a location in proximity to the at least one aircraft flight using a data mining technique;
        determine a risk or a status report (or both) of the aircraft flight's encounter with the ice water contents using the measure of ice water contents of the at least one aircraft flight, wherein the computing arrangement provides the risk or the status report of the aircraft flight's encounter with the ice water contents to the at least one output interface; and
        adjusting the at least one flight trajectory to ensure the ice water content risk or the status report (or both) of the at least one aircraft flight is below a threshold value.

The present system, when in operation, thus automatically estimates an exposure of ice water content of the at least one aircraft flight along any given flight trajectory in real time using the weather prediction model. The present system thus assists, when in operation, for aircraft flight planning and adjusting the flight trajectory of the at least one aircraft flight according to the expected ice water content exposure to obtain a modified flight trajectory. The present system thus reduces or mitigates the risk of ice water content exposure to the at least one aircraft flight by adjusting the aircraft flight planning. The present system optionally allows operators to determine, during the flight, whether it may be appropriate to alter the service (for example, to re-route the aircraft flight) to avoid the hazard. The present system optionally permits operators to determine possible changes to the flight trajectory, height or speed when the at least one aircraft is in flight, to avoid or reduce the risk of encountering a hazard.

The present system optionally prevents damages to the aircraft engines or in-flight failures, and thereby increases the aircraft engine's lifetime.

The present system thus reduces a need for performing maintenance of the at least one aircraft flight through short-term exposure to the ice water contents and also provides improved safety. The present system optionally schedules maintenance interventions for the at least one aircraft flight in response to the exposure of the at least one aircraft flight with the ice water contents present in the atmosphere. The system optionally schedules maintenance interventions based on an exposure rate including both a short-exposure, and a long-exposures of the at least one aircraft flight to the ice water contents. The system optionally prioritises maintenance for the at least one aircraft flight according to the exposure rate of the at least one aircraft flight with the ice water contents.

The at least one input interface optionally obtains the at least one aircraft flight plan data from a server. The aircraft flight planning system optionally be communicatively connected to a user device of a user for receiving the at least one aircraft flight plan data. The user device optionally comprises the at least one input interface. The at least one input interface optionally obtains at least one aircraft flight plan data from a sensor device or a radar device. The at least one aircraft flight plan data is optionally communicated to the user device/the automated system through a communication network. The user device optionally comprises the at least one output interface. The information related to the modified flight trajectory or aircraft flight plan is provided to an operating personnel. The information related to the modified flight trajectory or aircraft flight plan is provided to the automated system.

Hardware components employed to implement the present system optionally include a computing arrangement containing a processor, a memory and at least one storage medium containing the database associated with the present system. The database stores the datasets and historical ice data. In an embodiment, the aforesaid hardware components are associated with a server, and the at least one input interface is associated with a client side of the server or the user device. The server is optionally a tablet computer, a desktop computer, a personal computer or an electronic notebook; alternatively, the server is implemented using industrial data server units that provide high data reliability through use of multiple parallel data memories and majority voting arrangement and parity bit checking to ensure that the server delivers highly reliable data. In an embodiment, the server is optionally a cloud service. The user device optionally comprises a personal computer, a smartphone, a tablet, a laptop or an electronic notebook. The components of the system are in communication via the communication network that is optionally a wired network or a wireless network.

The server optionally comprises a database of datasets of ice water contents present in the atmosphere. The datasets of ice water contents include information on the ice water contents with respect to the latitude, the longitude, the elevation, the time and a historical ice data of historical flight trajectory data relating to a plurality of flights.

In an embodiment, the measure of the ice water contents for the at least one aircraft flight is calculated by a regression model or a statistical model or a machine learning model. The regression model or the statistical model or the machine learning model may be trained and optimized using historical ice water contents and at least one flight trajectory to determine the risk of the at least one aircraft flight's encounter with an ice water contents ahead of time. The regression model or the statistical model or the machine learning model may be trained and optimized with a simulation of the datasets. The regression model or the statistical model or the machine learning model may be a Monte-Carlo simulation model used to generate multiple model outputs and thereby derive an estimated probability, expectation or standard deviation, that the hazard may be present at some time in the future. It will be appreciated that "machine learning" relates to one or more software products that are executable on computing hardware, wherein the one or more software products are operable to amend, the one or more software products in an adaptive manner, for example via amendments to operating parameters of the one or more software products (for example parameters defining interconnections within neural networks having one or more feedback paths therein) in response to data that is processed through the computing hardware.

In an embodiment, the regression model or the statistical model or the machine learning model, or a threshold-based calculation from the regression model or the statistical model or the machine learning model outputs, may additionally or alternatively determine whether a hazard is present or not, or an approximate likelihood or a probability that the hazard is potentially present.

In an embodiment, the system calculates more than one modified flight trajectory, estimates atmospheric ice water content risk associated with more than one modified flight trajectory and compares ice water content risk associated with more than one modified flight trajectory. The lower ice water content risk associated with modified flight trajectory is recommended to the operating personnel or automatically adapted by the system.

According to an embodiment, the resultant indication related to the estimated atmospheric ice water content risk provided to the at least one output interface comprises at least one of: a status report (for a given aircraft) indicative of a physical state or condition, an index of the risk or atmospheric ice water content associated with the at least one aircraft flight; a recommendation on modification of at least one flight trajectory to mitigate or reduce atmospheric ice water content exposure; an indication of portions of the aircraft flight where risk or exposure exceeds a threshold value.

The index of the ice water content risk associated with the at least one aircraft flight comprises an expected exposure of the at least one aircraft flight to the ice water contents, or a probability of the hazard being present in material quantity, at a plurality of locations; heights, pressures or model levels; and times in the future. The recommendation on modification of at least one flight trajectory comprises creating a new aircraft flight plan for the at least one aircraft flight or rerouting the at least one aircraft flight. The recommendation on modification of at least one flight trajectory provides a number of alternate routes through different regions at slightly different times as part of the flight trajectory. From the estimated flight trajectory, expected location (e.g. latitude and longitude or similar map location), speed and height of the at least one aircraft flight may be determined at a number of time points.

In an embodiment, the system optimizes the recommendation by applying aircraft routing and computer technology known in the art, given at least one modified flight trajectory, to identify modifications to a flight trajectory. The modifications to the flight trajectory minimize a measure of the hazard such as its mean square, preferably in combination with minimizing at least one other cost metric such as flight duration and/or fuel consumption and/or maximizing separation from other hazards such as a position of other aircraft at the corresponding time. By applying or iterating such methods, the modified flight trajectory is beneficially recommended with a lower risk of the hazard than the original flight trajectory.

In an embodiment, the modified flight trajectory or the alternate flight plan are optionally presented to an operator, pilot or air traffic control for approval, or are optionally automatically adopted or communicated to the at least one aircraft flight.

According to an embodiment, the at least one input interface and the at least one output interface are configured to allow real-time information to be provided to the aircraft flight planning system.

In an embodiment, the system optimizes the recommendation on modification of at least one flight trajectory also considering further variables received from the at least one input interface.

The system optionally runs Weather Prediction Model (WRF) using boundary conditions (for example, ice water content boundary data) for predicting estimated ice water contents, and the output is an estimate of ice water contents by locations, altitudes and time.

The present system thus helps to determine the risk of the aircraft flight's encounter with the ice water contents present in the atmosphere using the measure of ice water contents of the at least one aircraft flight. The exposure of the at least one aircraft flight to the ice water contents is plotted on top of an existing icing envelope. By knowing ice water contents mass or concentration with respect to the existing icing envelope, the system optionally provides or enables more accurate or greater threat avoidance, which helps in determining whether the at least one aircraft flight may continue to operate safely in the atmosphere or whether the at least one aircraft flight should exit such atmosphere.

In an embodiment, the machine learning comprises any one of: linear regression, neural network, decision tree, decision forest or gradient boosted decision tree, radial basis function, support vector machine, Gaussian process, or principal component analysis.

The machine learning optionally includes at least one of time within a year or time of day as regression parameters.

In yet another embodiment, the weather prediction model derives estimates of the mixing ratio and/or a concentration of ice water contents at a plurality of locations and times.

In yet another embodiment, the weather prediction model provides at least one of: an estimated average of ice water contents for each location by time-of-day and time-of-year, a standard deviation of ice water contents for each location by time-of-day and time-of-year.

In yet another embodiment, the at least one aircraft flight data comprises flight phase and estimation of at least one of airspeed or engine mass flow and associated location, time and date information.

The present system comprises datasets (modelled, sensed or observed) of the ice water contents, combined with the existing icing envelope, to determine at least one aircraft flight's real-time (or near-real time) exposure to the ice water contents that potentially causes engine and air data sensor failures. The real time is defined as a guaranteed prediction of the ice water content risk within a specified time constraint; for example, by "real time" is meant more frequently than every 10 minutes, optionally more frequently than every 2 minutes, and yet more optionally more frequently than 30 seconds. The datasets optionally help to improve an air transportation safety and extend an airframe productivity. Implementing the system in the aircraft flight will improve environmental uncertainties, which could also lead to an implementation of a new certification requirements, which in turn could increase the aircraft productivity. If the system is simulated in forecast mode, the user optionally uses the system to plan safer and fuel-efficient flights, and an airline optionally mitigates the risk of flight disruption due to tropical storms. The system optionally runs at very high spatial and temporal resolution. The system optionally complements patchy and discontinuous observation. The system improves a microphysics scheme and also a mass and a size of all hydrometeor species, for example rain, ice, snow, and graupel, which is important for the tropical clouds.

The weather prediction model is advantageous in forecasting and predicting the risk of the at least one aircraft flight's encounter with the ice water contents. The risk of the at least one aircraft flight's encounter with the ice water contents is then transmitted to an electronic flight bag and/or to the airline or a flight dispatcher in order to adjust the at least one flight trajectory to ensure the ice water content risk of the at least one aircraft flight is below a threshold value.

In an embodiment, the user may be a pilot of the at least one aircraft flight or a flight planner. The pilot or the flight planner or the airline optionally accesses the ice water content risk of the at least one aircraft flight in an efficient way. The access of the ice water content risk into a cockpit (via an electronic flight bag) is necessary, in order to use the datasets in an effective way and to adjust the at least one flight trajectory to ensure the ice water content risk of the at least one aircraft flight is below a threshold value.

As a result, the existing icing envelope is not necessarily needed, but the ice water content risk of the at least one aircraft flight's encountering the ice water contents optionally be achieved conceptually through the electronic flight bag.

The real-time ice water content risk of the at least one aircraft flight optionally assists in developing a new ice detection system or an ice protection system and revises an overall applicability and usefulness of an existing icing envelope boundaries in the at least one aircraft flight at high altitudes. For example, reports on the ice water contents at very low temperature (e.g. lower than −60° C.) potentially lead to a revision of the existing icing envelope, and also optionally lead to a testing of pitot tubes (and other vital measurements) to lower temperatures in order to improve reliability and precision.

The system includes at least one storage medium coupled directly or indirectly to the computing arrangement and includes datasets of ice water contents present in an atmosphere, wherein the datasets of ice water contents comprise information on the ice water contents with respect to a latitude, a longitude, an elevation, and a time.

In an embodiment, the weather prediction models or observations (or a combination of both) is used in indicating a real-time (or a near real-time and historical) exposure of the at least one aircraft flight with the ice water content risk present in the atmosphere. The system identifies threats of other vehicle movements to some type of environmental and ice water content exposure (the other vehicles includes a ship, a helicopter, drones, air ships, an ice accretion on wind turbines). The system is also useful in commercial aircraft flying at high altitudes in and around areas of deep convection, particularly Tropical regions. The exposure of any environmental contaminant could be calculated along any given vehicle trajectory. The decision-making process would then select the route with the lowest probability of encountering high exposure.

In an embodiment, the risk prediction of the aircraft flight's encounter with the ice water contents is transmitted to the user through a telecommunication satellite.

According to an embodiment, the computing arrangement generates a new flight trajectory for the at least one aircraft flight to reduce probabilities of encountering with the ice water contents based on the ice water content risk.

According to an embodiment, the at least one input interface receives a historical data relating to the at least one aircraft flight.

According to an embodiment, the weather prediction model is trained using a set of training data comprising historical datasets related to a plurality of flights, wherein the historical datasets comprise an aircraft flight data, an atmospheric data comprising ice water contents over a location, a time, a latitude and a trajectory.

According to an embodiment, the weather prediction model is configured on data provided from at least one of satellites, aircraft probes and a lidar.

"Lidar" ("light imaging, detection and ranging") is a surveying method that measures distance to a target by illuminating the target with pulsed laser light and measuring the reflected pulses with a sensor; often, the laser light has a frequency corresponding to infra-red electromagnetic radiation. Differences in laser return times and wavelengths are susceptible to being used to generate digital 3-D representations of the target. It has terrestrial, airborne, and mobile applications. Lidar is commonly used to make high-resolution maps, with applications in geodesy, geomatics, archaeology, geography, geology, geomorphology, seismology, forestry, atmospheric physics, laser guidance, airborne laser swath mapping (ALSM), and laser altimetry.

According to an embodiment, the weather prediction model comprises at least one of a Weather Research and Forecasting (WRF) model, a Model for Prediction Across Scales (MPAS), a Unified Model (UM) or a Copernicus Atmospheric Monitoring Service (CAMS) model.

According to an embodiment, the ice water content risk comprises exposure rates of the at least one aircraft flight to a mean or the threshold value of the ice water contents along the flight trajectory.

The present disclosure relates to a method for (of) using a computing arrangement for aircraft flight planning, wherein the method comprises:
 receiving at least one aircraft flight plan data including at least one of a time, a pressure, an altitude, a trajectory or a location representing at least one aircraft flight;
 determining at least one measure of historical ice water contents for a set of training data by retrieving datasets of atmospheric ice water contents at a location, an altitude and a time in proximity to at least one trajectory of the at least one aircraft flight in the aircraft flight plan data;
 providing the historical ice water contents and the at least one flight trajectory as inputs for use in a weather prediction model;
 determining a measure of ice water contents for the at least one aircraft flight in real-time by retrieving the datasets of ice water contents of at least one of a time, a pressure, an altitude, a trajectory or a location in proximity to the at least one aircraft flight using a data mining technique;
 determining a risk or a status report (or both) of the aircraft flight's encounter with the ice water contents using the measure of ice water contents of the at least one aircraft flight, wherein the computing arrangement provides the risk or the status report (or both) of the aircraft flight's encounter with the ice water contents to the at least one output interface; and
 adjusting the at least one flight trajectory to ensure the ice water content risk or the status report of the at least one aircraft flight is below a threshold value.

It will be appreciated that the aforesaid present method is not merely a "method of doing a mental act" as such, but has a technical effect in that the method employs measurement data and functions as a form of technical control using machine learning of a technical artificially intelligent system; the method involves building an artificially intelligent machine learning model and/or using the machine learning model to address, for example to solve, the technical problem of estimating ice water content exposure of the at least one aircraft flight on the at least one flight trajectory and adjusting the at least one flight trajectory to ensure the ice water content risk of the aircraft flight is below a threshold value.

According to an embodiment, the method comprises generating a new flight trajectory for the at least one aircraft flight to reduce probabilities of encountering of the at least one aircraft flight with the ice water contents based on the ice water content risk.

According to an embodiment, the method comprises training the weather prediction model using a set of training data comprising historical datasets related to a plurality of flights, wherein the historical datasets comprise an aircraft flight data, an atmospheric data comprising ice water contents over a location, a time, a latitude and a trajectory.

According to an embodiment, the ice water content risk comprises a computation of exposure rates of the at least one aircraft flight to a mean or the threshold value of the ice water contents along the flight trajectory.

According to an embodiment, the ice water content risk comprises information on an icing envelope and maps of exposure of the at least one aircraft flight to the ice water contents.

According to an embodiment, the method comprises using at least one input interface to receive a historical data relating to the at least one aircraft flight.

The advantages of the present method are thus identical to those disclosed above in connection with the present system and the embodiments listed above in connection with the system apply mutatis mutandis to the method.

The present disclosure provides a computer program product comprising instructions to cause the above system to carry out the above method.

The advantages of the present computer program product are thus identical to those disclosed above in connection with the present system and the embodiments listed above in connection with the system apply mutatis mutandis to the computer program product.

Embodiments of the present disclosure may automatically estimate an exposure of ice water content of the at least one aircraft flight along any given flight trajectory in real time using the weather prediction model. Embodiments of the present disclosure may assist, when in operation, for aircraft flight planning and adjusting the flight trajectory of the at least one aircraft flight according to the expected ice water content exposure to obtain a modified flight trajectory. Embodiments of the present disclosure may reduce or mitigate the risk of ice water content exposure to the at least one aircraft flight by adjusting the aircraft flight planning. Embodiments of the present disclosure may prevent damages to the aircraft engines or in-flight failures, and thereby increases the aircraft engine's lifetime. Embodiments of the present disclosure may assist to recommend flight maintenance interventions such as engine washes when they are most needed (e.g. immediately after the ice water content risk exposure) rather than when the results of damage to the aircraft engine are observed by sensors. Embodiments of the present disclosure may prioritise maintenance for the at least one aircraft flight according to the exposure rate of the at least one aircraft flight with the ice water contents.

DETAILED DESCRIPTION OF THE DRAWINGS

FIG. 1 is a schematic illustration of a system 100 according to an embodiment of the present disclosure. The system 100 comprises component elements including a first storage medium 102, a control module 104, an input interface 106 and an output interface 108. The control module 104 comprises a processor 110 and a memory 112. The function of these component elements as has been described above; the component elements exchange data therebetween, for example in an encrypted format, to provide a functionality of the system 100, as aforementioned.

Figure 2:
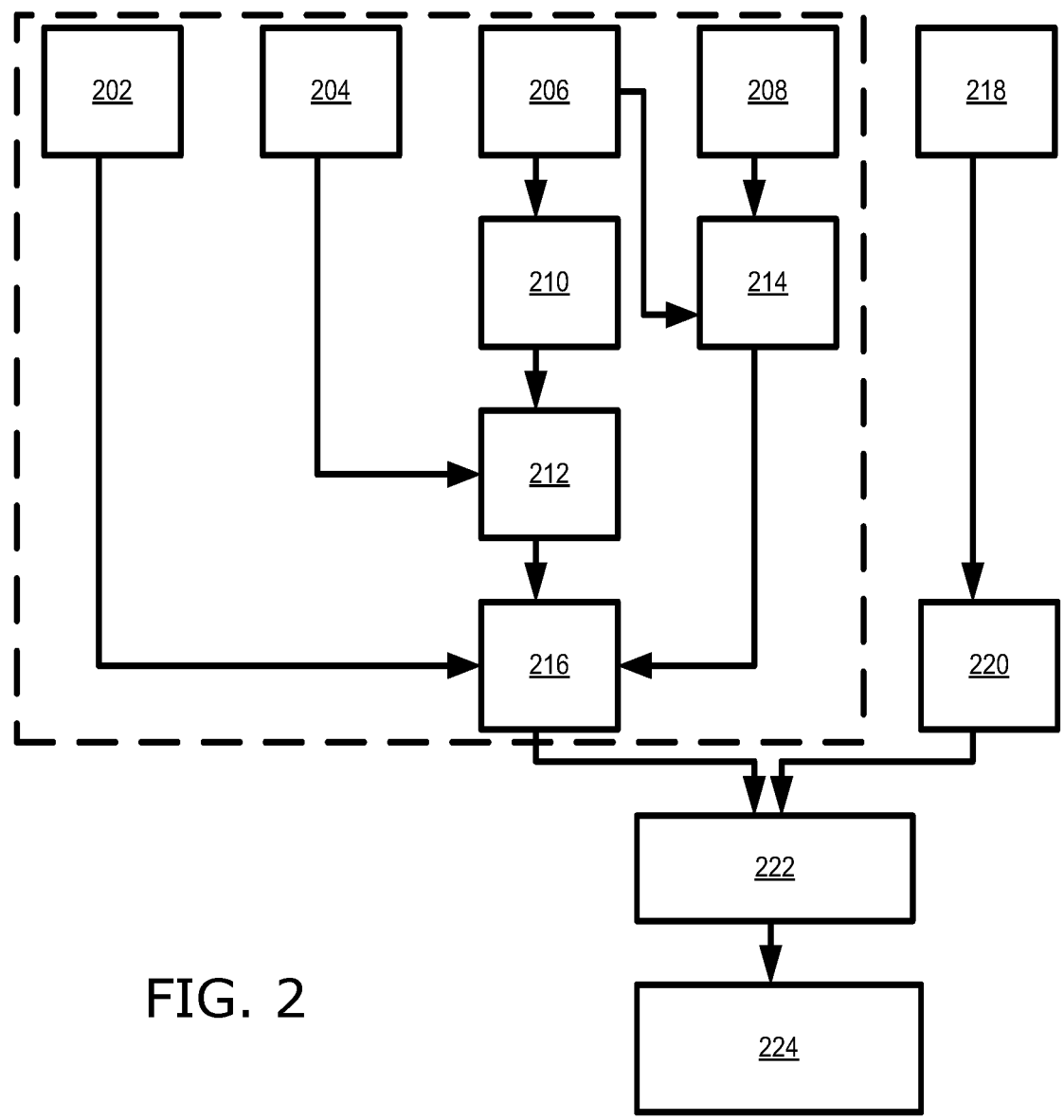
FIG. 2 is a flowchart illustrating steps of a method for (of) training an engine health model to predict an engine health parameter of an aircraft engine according to an embodiment of the present disclosure.

FIG. 2 is a flowchart illustrating steps of a method for (of) training an engine health model to predict an engine health parameter of an aircraft engine in accordance with an embodiment of the present disclosure. At a step 202, one or more input variables that include engine or aircraft control, loading or operational parameters, engine or aircraft model and type information, sensor data, weather parameters, temperatures, speeds, altitudes, mass flow rates, fuel flow rates, vibration measures, inspection results or wear estimates, are obtained. At a step 204, atmospheric contaminant data over location and time are obtained from a contamination database. At a step 206, aircraft flight history is obtained from a historical database. At a step 208, assignment data of aircraft engines and engine service data are obtained from the historical database. At a step 210, historical aircraft trajectories are determined from the historical database. At a step 212, contaminant exposure measure for a target aircraft engine is determined in real-time by retrieving atmospheric contaminant data at a location and a time in proximity to at least one target aircraft engine. At a step 214, engine run time, cycles and hours are determined from the assignment data of engines to the aircraft, the engine service data, and the aircraft flight history. At a step 216, inputs such as the historical contaminant exposure, the engine service data and the one or more input variables are provided to an engine health model. At a step 218, engine health and engine life data are derived from maintenance records. At a step 220, output variables are selected for the engine. At a step 222, the engine health model is trained to provide a predictive model using machine learning. At a step 224, an engine health parameter of the target aircraft engine is predicted and the effect of contaminants is incorporated using the predictive model.

Figure 3:
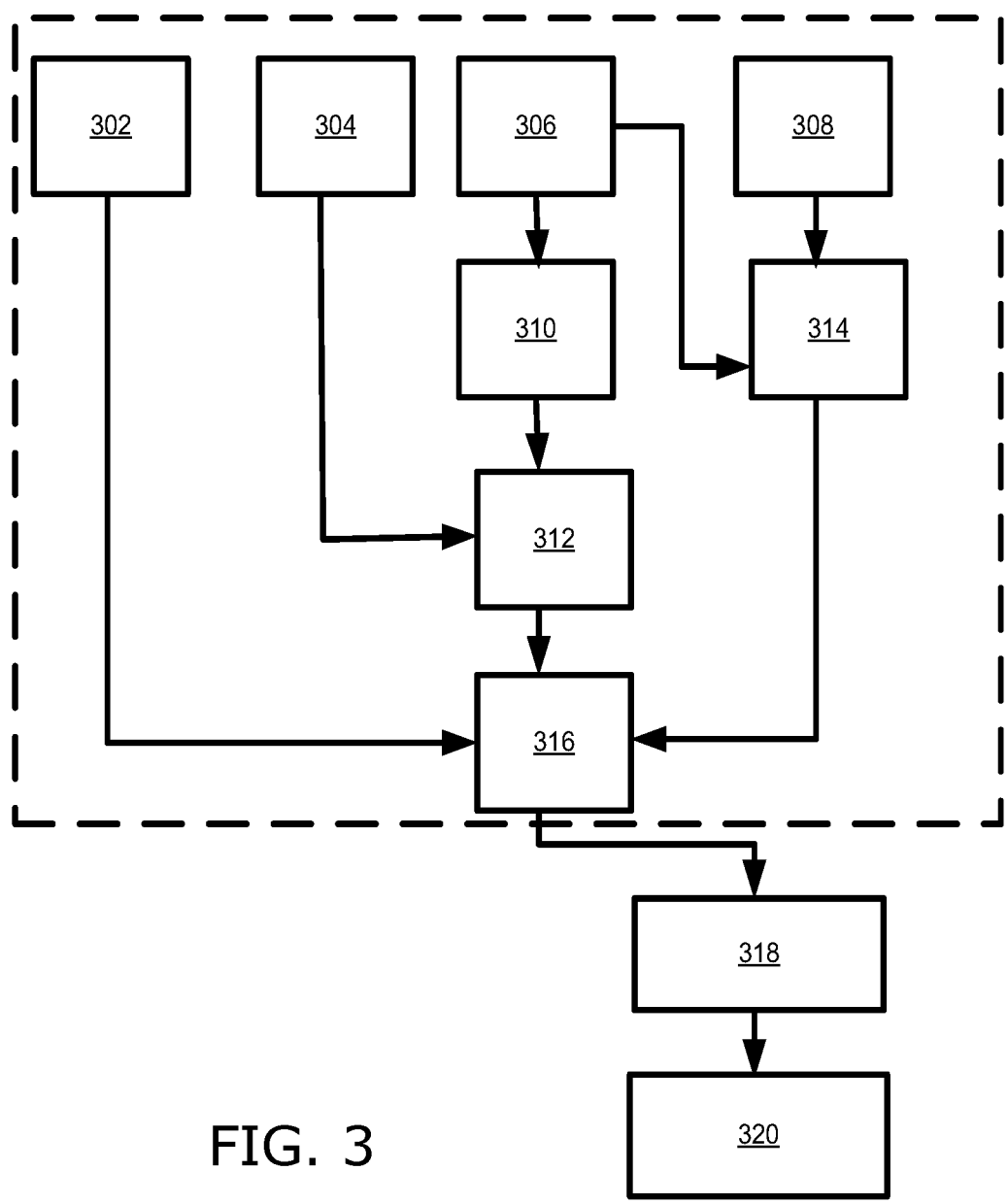
FIG. 3 is a flowchart illustrating steps of a method for (of) predicting an engine health parameter of the engine or the aircraft using a predictive engine health model according to an embodiment of the present disclosure.

FIG. 3 is a flowchart illustrating steps of a method for (of) predicting an engine health parameter ("state of health") of the engine or the aircraft using a predictive engine health model according to an embodiment of the present disclosure. At a step 302, one or more input variables are obtained. At a step 304, atmospheric contaminant data over location and time are obtained from a contamination database of contamination data over location and time. At a step 306, aircraft flight history is obtained from a historical database of historical data. At a step 308, assignment data of engines to aircrafts and engine service data are obtained. At a step 310, historic aircraft trajectories are determined from the historical database. At a step 312, contaminant exposure measure for a target aircraft engine is determined in real-time by retrieving atmospheric contaminant data at a location and a time in proximity to at least one flight of the target aircraft engine. At a step 314, engine run time, cycles and hours are determined from the assignment of engines to the aircraft and the engine service data and the aircraft flight history. At a step 316, inputs such as the historical contaminant exposure and the engine service data and the one or more input variables are provided to an engine health model. At a step 318, an engine health parameter of the target aircraft engine is predicted and effect of contaminants are incorporated using the predictive model. At a step 320, engine health and remaining useful life are predicted using the predictive model.

Figure 4:
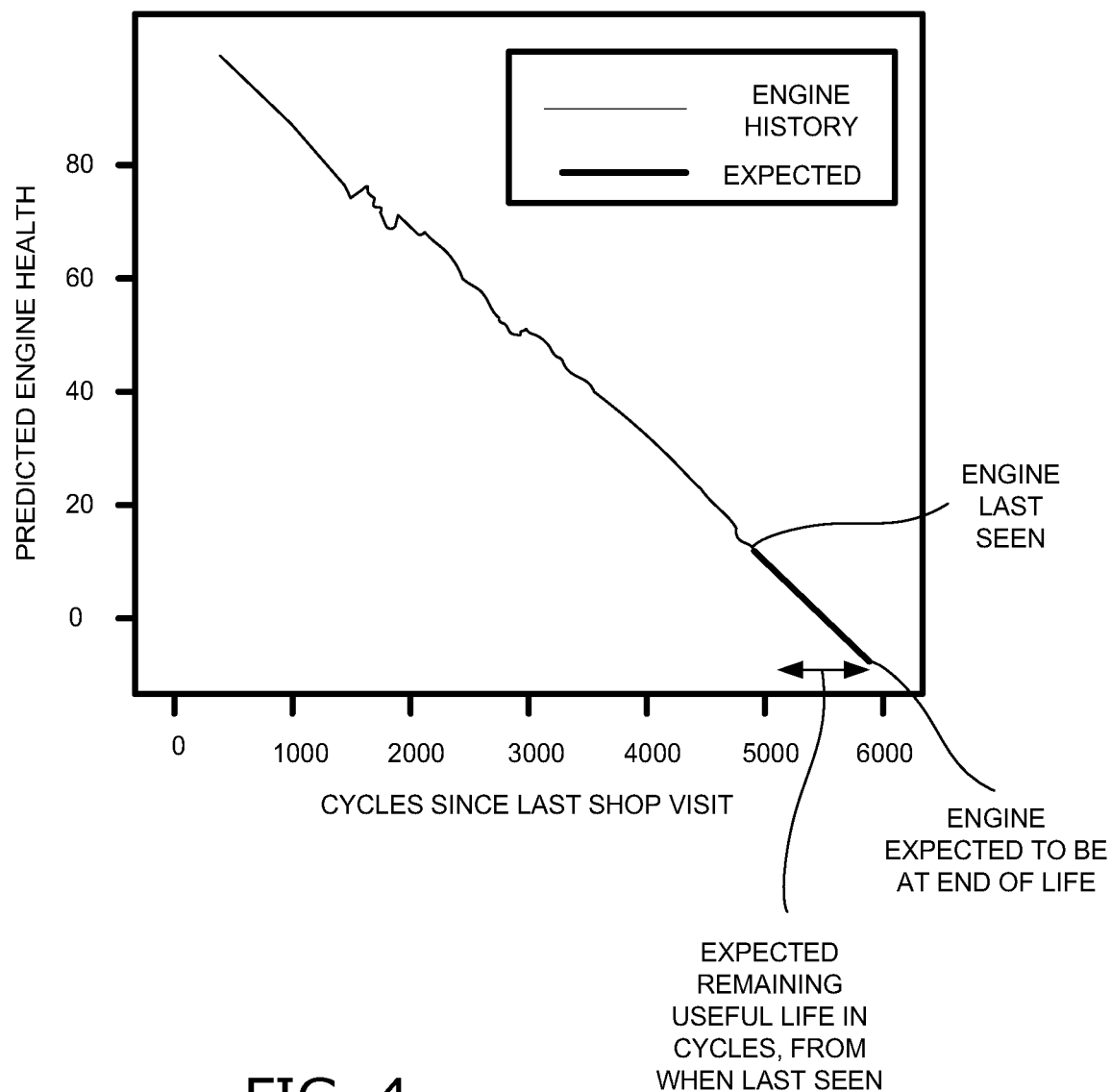
FIG. 4 is a graphical illustration of a predicted engine health in an ordinate Y-axis plotted against a number of cycles since last shop visit in an abscissa X-axis to predict an expected remaining useful life in accordance with an embodiment of the present disclosure.

FIG. 4 is a graphical illustration of a predicted engine health in an ordinate Y-axis plotted against a number of cycles since last shop visit in an abscissa X-axis to predict an expected remaining useful life in accordance with an embodiment of the present disclosure. An expected end of life of an aircraft engine may be determined from an output of the predictive engine health model. The expected end of life of an aircraft engine may be used to plan when the aircraft engine requires replacement or removal or a shop visit. In an embodiment, a life of the aircraft engine is reduced from a last service/shop visit if the environmental contaminant exposure affects the aircraft engine. The life of the aircraft engine is extended as expected to be at the end of life of the aircraft engine by predicting an engine health parameter using the predictive engine health model. For example, the number of cycles since last shop visit is increased from 5000 to 6000 when the engine health parameter of at least one aircraft engine is predicted. In an embodiment, an expected remaining useful life in cycles for an aircraft engine is automatically determined from the last shop visit or service. The engine health index is calculated on a scale of 0 to 100. In an embodiment, a value 100 indicates a new engine with an ideal performance and a value 0 indicates that the aircraft engine requires a shop visit.

Figure 5:
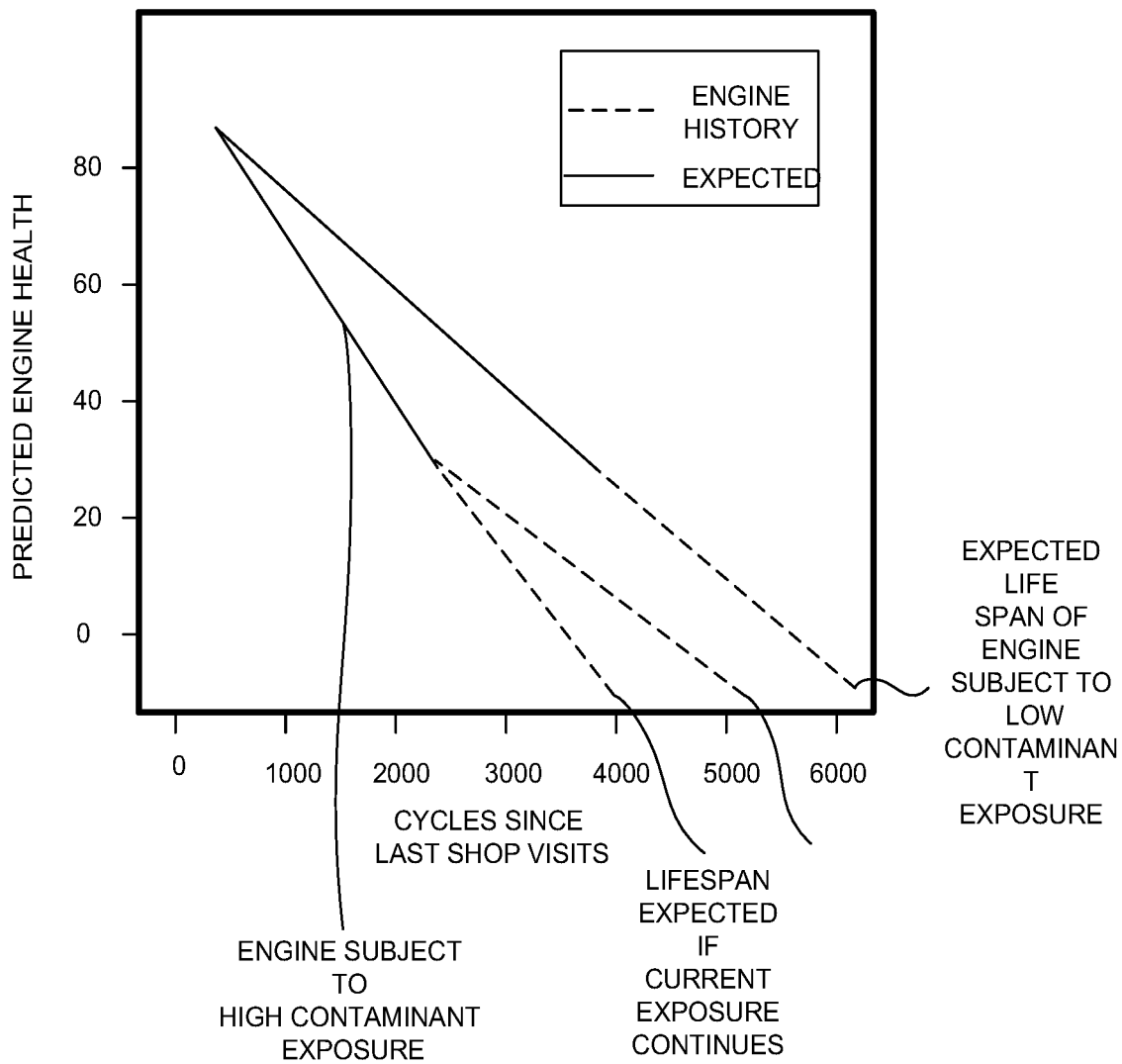
FIG. 5 is a graphical illustration of a predicted engine health in an ordinate Y-axis plotted against a number of cycles since last shop visit in an abscissa X-axis to predict an expected lifespan of the engine for different levels of exposure to contaminants in accordance with an embodiment of the present disclosure.

FIG. 5 is a graphical illustration of a predicted engine health in an ordinate Y-axis plotted against a number of cycles since last shop visit in an abscissa X-axis to predict an expected lifespan of the engine for different levels of exposure to contaminants in accordance with an embodiment of the present disclosure. The graphical illustration shows an effect of an intervention on an aircraft engine that had previously been subjected to high contaminant exposure is indicated. Expected lifespan of the aircraft engine is reduced if a current exposure continues (for example, a lifespan of the of the aircraft engine may be 4000 cycles when the engine is subjected to high contaminant exposure). The expected lifespan of the aircraft engine increases if a service is modified or a maintenance practice is improved to reduce future contaminant exposure and optimise maintenance to reduce effects of contaminants (for example, the lifespan of the engine or the aircraft is increased from 4000 cycles to 5000 cycles). The graphical illustration further shows the expected lifespan of an aircraft engine is increased when the aircraft engine is subject to low contaminant exposure.

Figure 6:
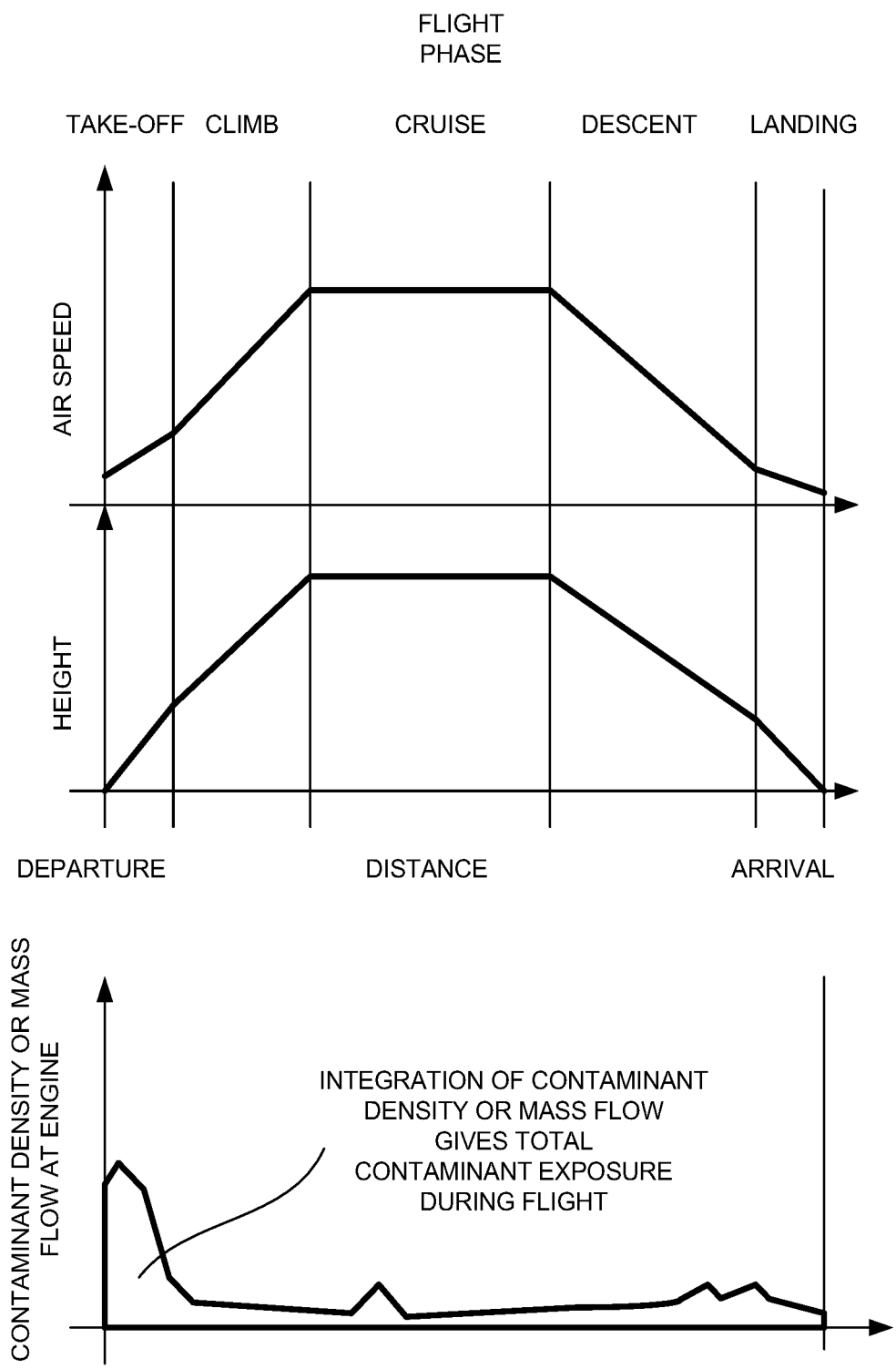
FIG. 6 is a graphical illustration of a flight trajectory model of flight phases and contaminant density at the engine at the flight phases in accordance with an embodiment of the present disclosure.

FIG. 6 is a graphical illustration of a flight trajectory model of flight phases and contaminant density at the engine at the flight phases in accordance with an embodiment of the present disclosure. The graphical illustration shows that the distance is plotted in an abscissa X-axis and the airspeed is plotted in an ordinate Y-axis. The graphical illustration further shows that the distance is plotted in the abscissa X-axis and the height is plotted in the ordinate Y-axis. The graphical illustration shows the airspeed at different flight phase includes take-off, climb, cruise, descent and landing of a flight and the height of the flight which is varied at departure, cruise and arrival of the flight. A control module may determine an exposure index which is a measure of a contaminant exposure or an amount of contaminant material that passes through the aircraft engine in the aircraft fleet based on its flight trajectory. The total contaminant exposure during flight is obtained using integration of contaminant density or mass flow at the aircraft engine.

Figure 7A:
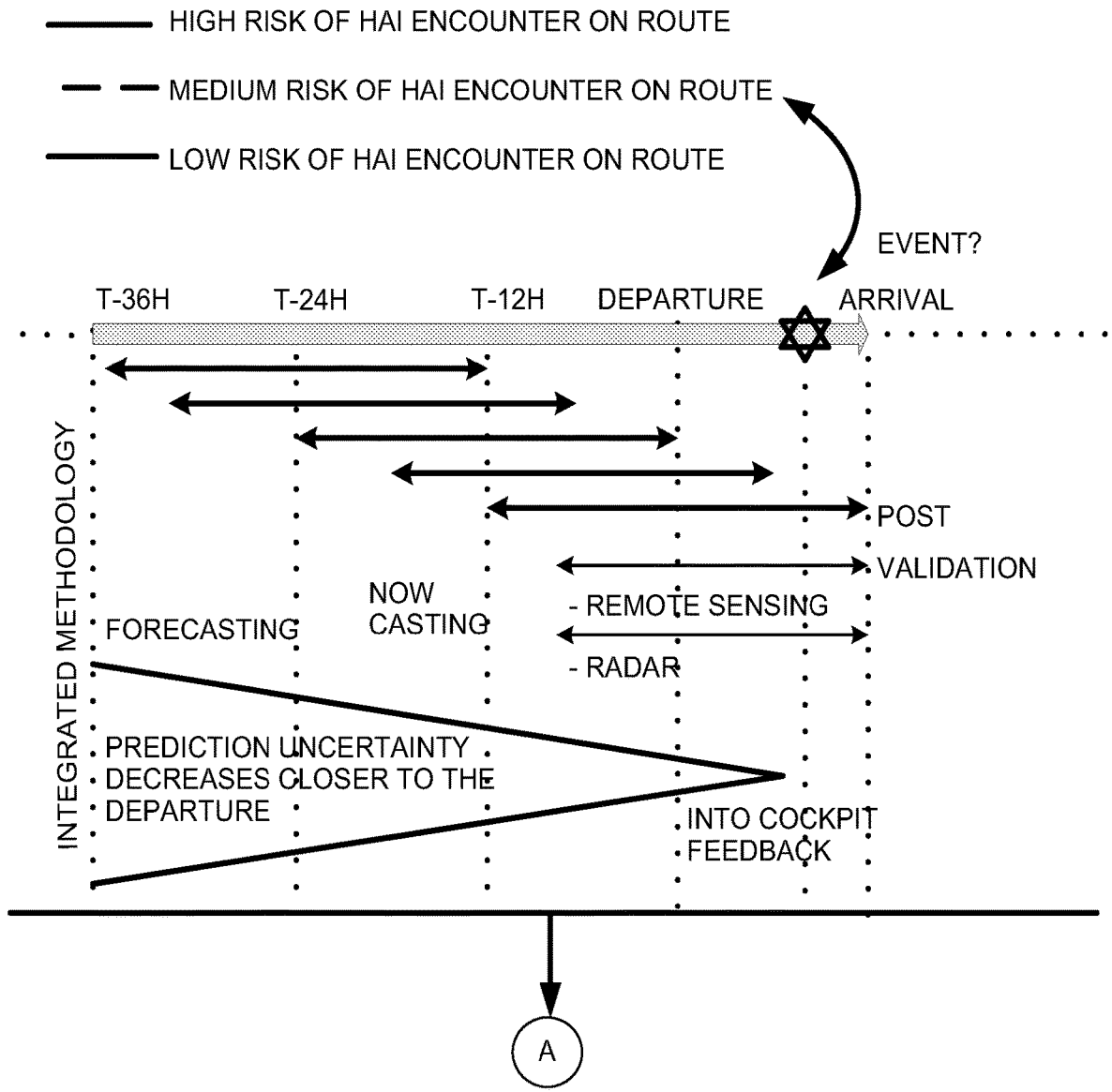
FIGS. 7A to 7B are graphical illustrations of an integrated method for using the system of FIG. 1, wherein the method employs a cost awareness (CA) and a risk mitigation (RM) for predicting a risk of high-altitude ice (HAI) being encountered on an aircraft route at different periods from a departure time, in accordance with an embodiment of the present disclosure.
Figure 7B:
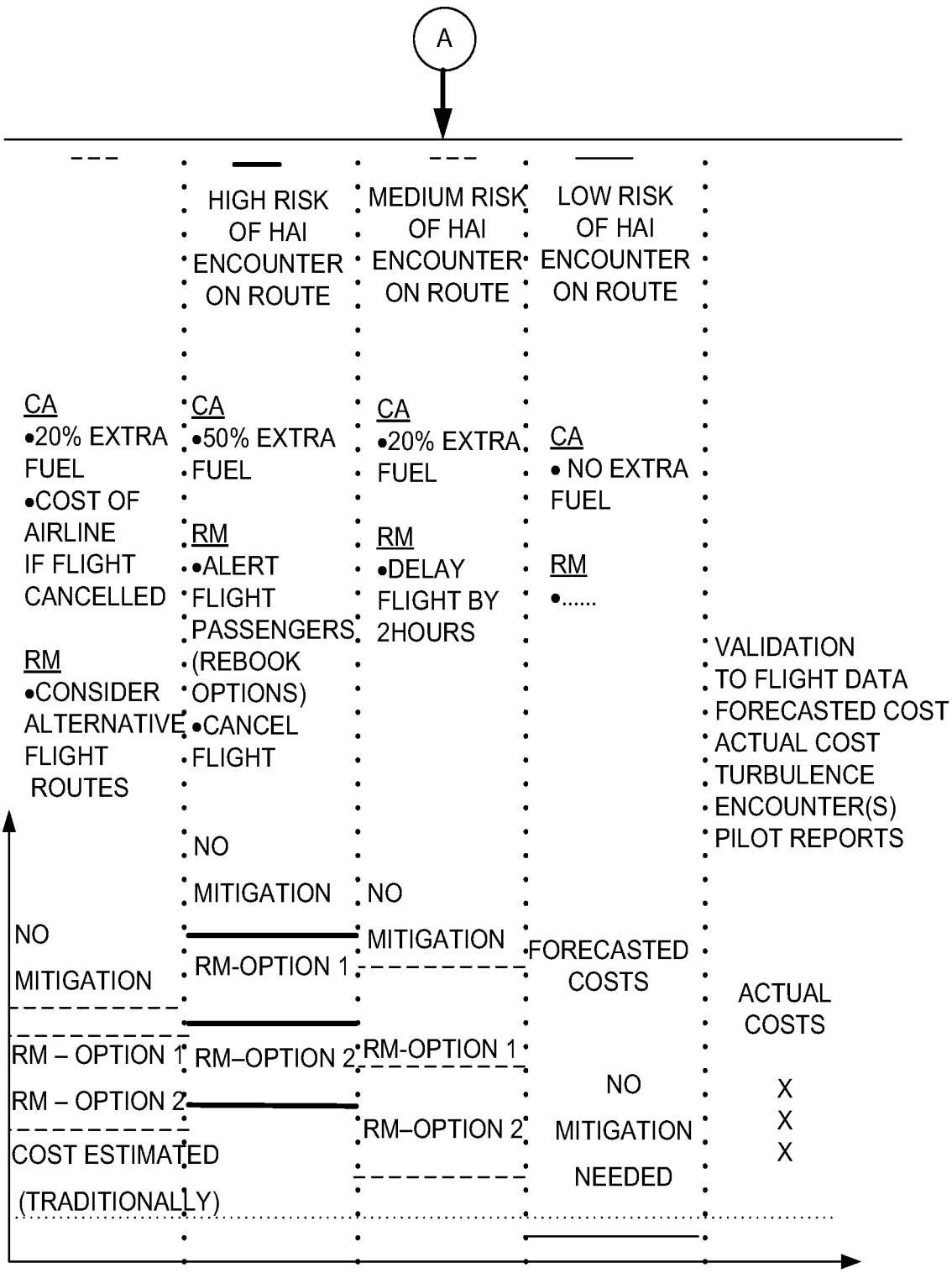

FIGS. 7A to 7B are graphical illustrations of an integrated method for (of) using the system 100 of FIG. 1, wherein the method includes employing a cost awareness (CA) and a risk mitigation (RM) for predicting a risk of high-altitude ice (HAI) being encountered on an aircraft route at different periods from a departure time, in accordance with an embodiment of the present disclosure. The graphical illustrations elucidate forecasting, nowcasting and post-validation of an airline/aircraft engine. The system 100 beneficially determines a possibility of a specific route at risk by assembling of numerical weather prediction (NWP) model and trajectory models for forecasting a future of the aircraft engine. In an embodiment, the system 100 obtains a method of forecasting in future using a specially-configured atmospheric model. The system 100 determines nowcasting of the aircraft engine by integration of various nowcast products (namely circa ~10-minute updates). The system 100 determines post validation to estimate a risk of a hazard being present at a location and time in future, by applying a spatial and/or temporal uncertainty calculation to an indication related to the estimated atmospheric contamination risk. For example, uncertainty in future movement of air due to wind are represented with a standard deviation in units of distance, and a kernel function such as a radial Gaussian with a radius proportional to such standard deviation is applied to a matrix of hazard probability estimates to derive a spatially smoothed probability. In an embodiment, the post validation of the aircraft engine is determined using machine learning. In an embodiment, the uncertainty estimation beneficially uses an approximation to Bayes' Theorem. In an embodiment, the graphical illustration shows that prediction uncertainty decreases closer to a departure of an aircraft. The graphical illustrations further depict an event indication that is occurred before the departure of the aircraft. The event indication comprises a high risk of a HAI encounter on route, a medium risk of a HAI encounter on route and a low risk of a HAI encounter on route. The indications for the estimated risk on a specific route comprise computations using a cost awareness (CA) and a risk mitigation (RM). The graphical illustration further shows actual costs for the aircraft with forecasted costs of the aircraft. In the medium risk of a HAI encounter on the route, the cost of the aircraft increases by 20% due to extra fuel cost if the flight is canceled. The system 100 optionally prefers a risk mitigation as alternative flight routes for passengers to reduce the cost for aircraft. In the high risk of a HAI encounter on route, the cost of the airline increases by 50% due to extra fuel if the flight is canceled. The system 100 beneficially provides alerts including a risk mitigation to the flight passengers to rebook or cancel the flight. In the medium risk of HAI encounter on the route, the cost for aircraft increases by 20% due to extra fuel cost if the flight is canceled and the system optionally delays the flight by two hours. The cost awareness and the risk mitigation option for the low risk of HAI encounter on route comprise no extra fuel and no mitigation needed respectively. The cost awareness and the risk mitigation beneficially validate flight data that comprises forecasted cost, actual cost, turbulence encounter(s) and pilot reports.

Figure 8A:
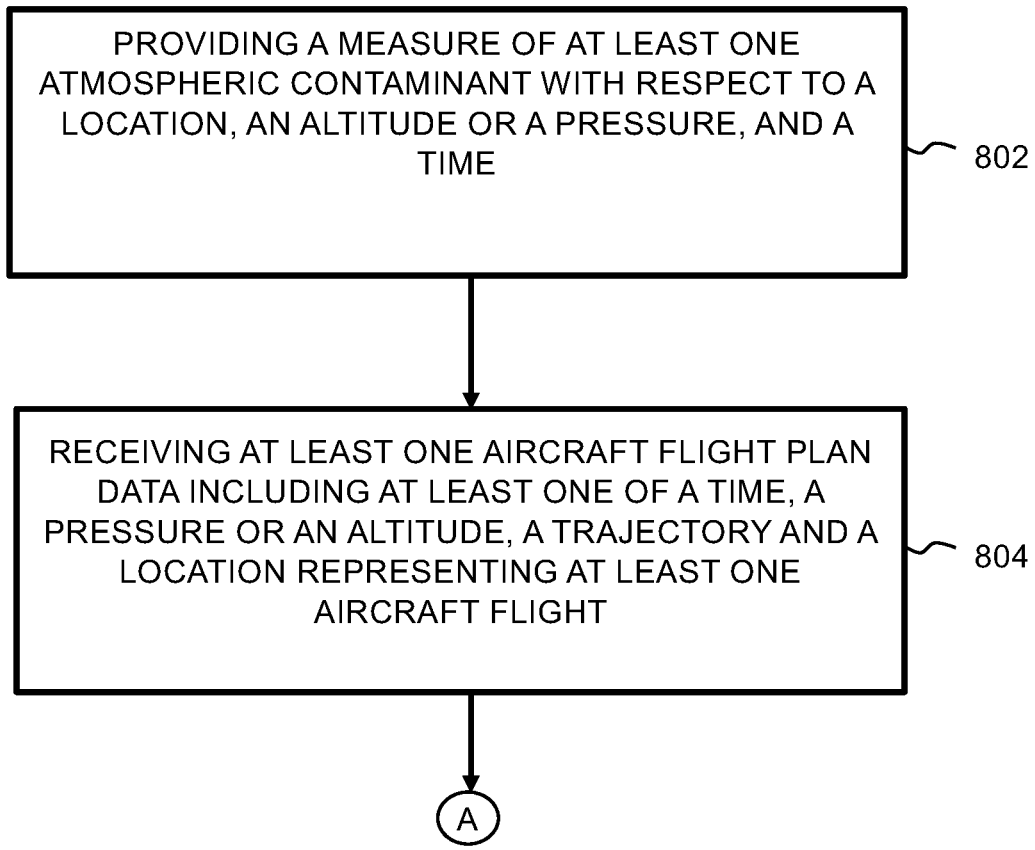

In FIGS. 8A to 8B, there are shown illustrations of a flow diagram that elucidate a method for (of) aircraft flight control according to an embodiment of the present disclosure. At a step 802, a measure of at least one atmospheric contaminant with respect to a location, an altitude or a pressure, and a time is provided. At a step 804, at least one aircraft flight plan data includes at least one of a time, a pressure or an altitude, a trajectory and a location representing at least one aircraft flight that is received. At a step 806, an estimate of the contaminant risk to at least one an aircraft for at least one flight plan is calculated using the measure of at least one atmospheric contaminant. At a step 808, at least one aircraft flight plan is adjusted to ensure the measure of contaminant risk is below a threshold value.

Figure 9:
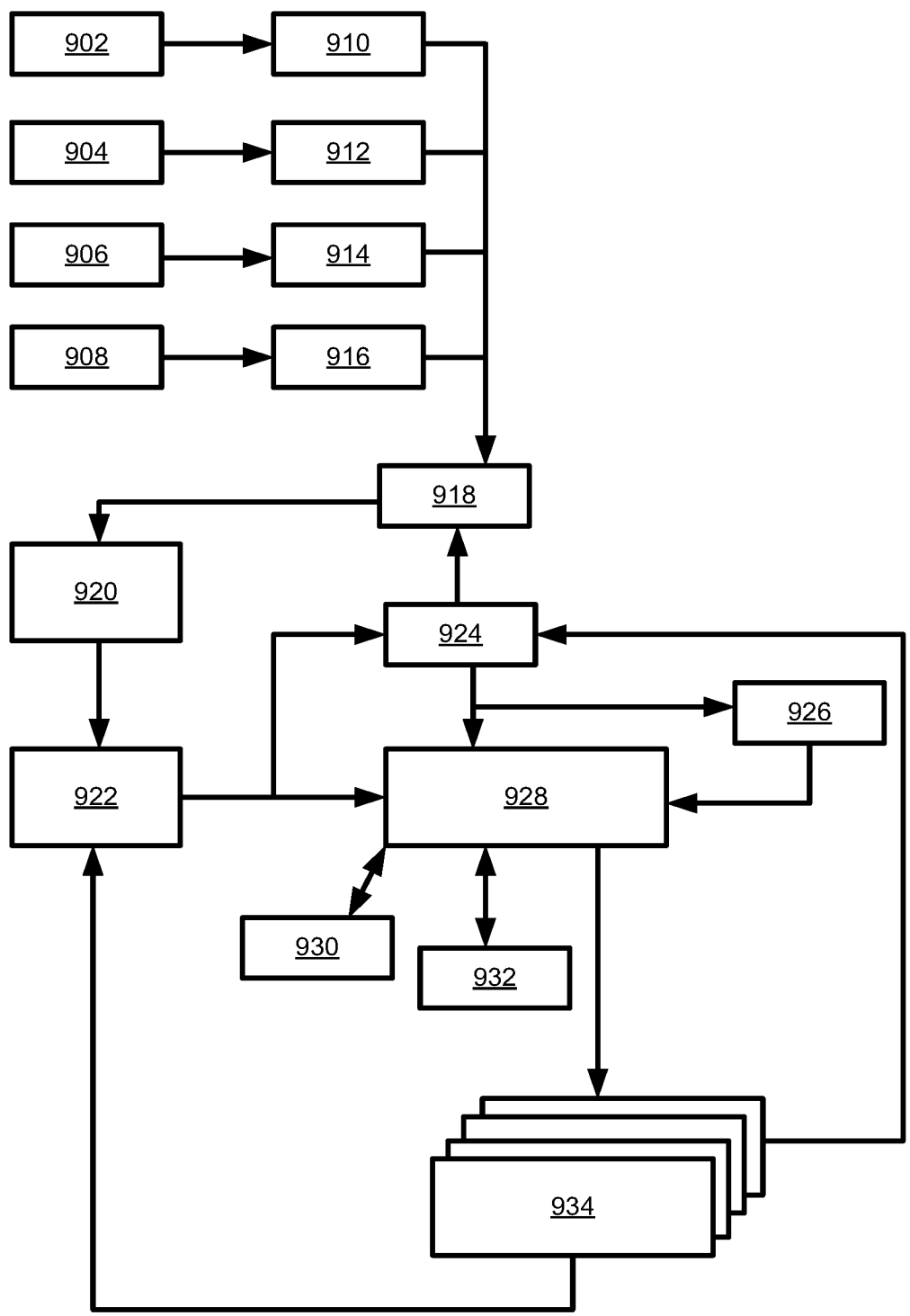
FIG. 9 is an illustration of a method for (of) determining contaminant data using one or more servers, a supercomputing and/or a distributed computing platform according to an embodiment of the present disclosure.

In FIG. 9, there is provided an illustration of steps of a method for (of) determining contaminant data using one or more servers, a supercomputing and/or a distributed computing platform according to an embodiment of the present disclosure. At a step 902, satellite data is obtained. At a step 904, flight monitoring data is obtained. At a step 906, surface measures are obtained. At a step 908, radiosondes data is obtained. At a step 910, the satellite data is processed. At a step 912, the flight monitoring data is processed. At a step 914, the surface measures are processed. At a step 916, the radiosondes data is processed. At a step 918, import data is calibrated. At a step 920, boundary conditions for the import data are determined and configured. At a step 922, the determined boundary conditions are provided to a supercomputing or a distributed computing platform. At a step 924, the determined boundary conditions are validated. At a step 926, weather models are determined. At a step 928, the boundary conditions, the weather models and the validated boundary conditions are obtained and processed by the supercomputing or distributed computing platform. At a step 930, the processed data is stored in a storage or distributed storage. At a step 932, the processed data are stored in a working memory. At a step 934, contaminant distribution of at least one of latitude and longitude, altitude and/or pressure level or time are forecasted using the supercomputing or the distributed computing platform. In an embodiment, the forecast of contaminant data is generated for various latitude, longitude, altitude, pressure level or time.

Figure 10:
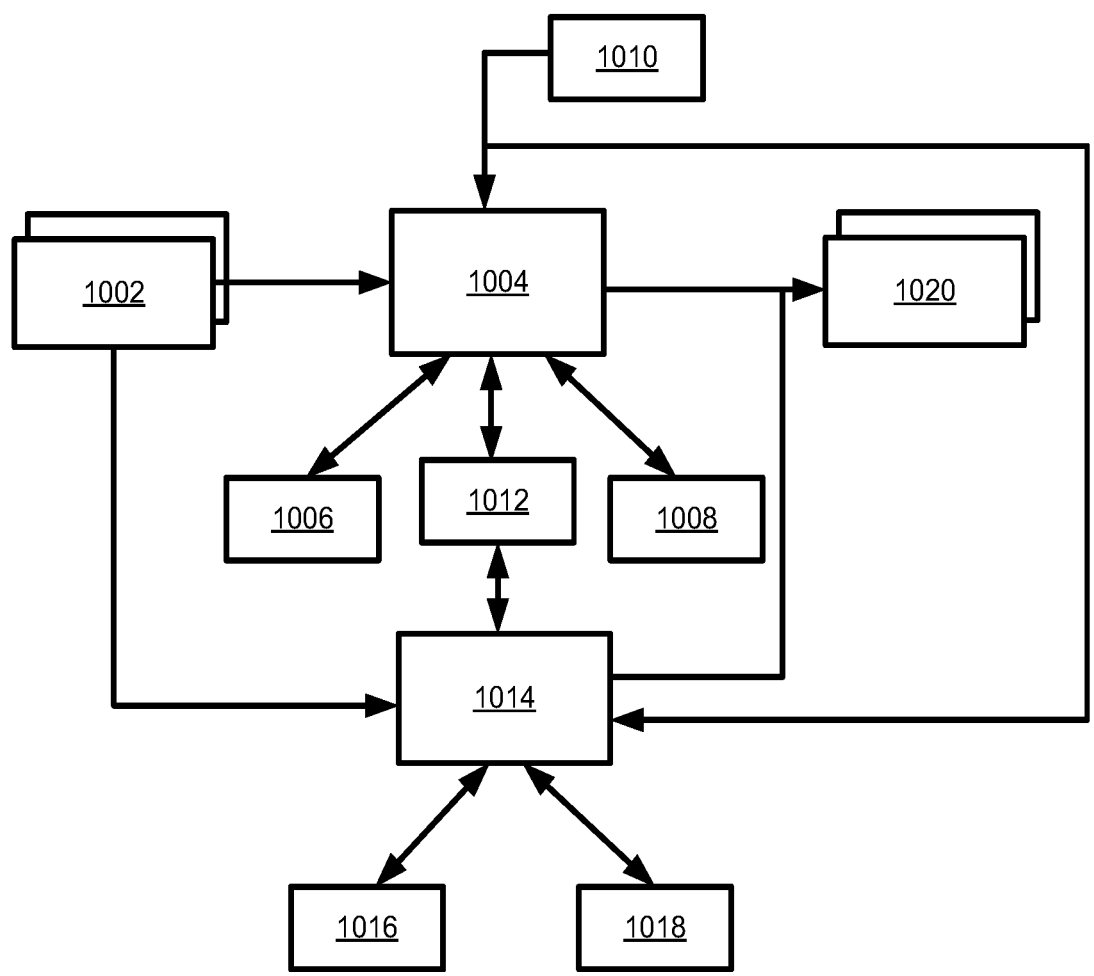
FIG. 10 is an illustration of an exploded view of a distributed computing system or cloud computing implementation in accordance with an embodiment of the present disclosure.

In FIG. 10, there is provided an illustration of an exploded view of component elements of a distributed computing system or cloud computing implementation in accordance with an embodiment of the present disclosure. The exploded view comprises an input interface 1002, a control module that comprises a processor 1004, a memory 1006 and a non-volatile storage 1008, processing instructions 1010, a shared/distributed storage 1012, a server that comprises a server processor 1014, a server memory 1016 and a server non-volatile storage 1018 and an output interface 1020. The function of the server processor 1014, the server memory 1016 and the server non-volatile storage 1018 are thus identical to the processor 1004, the memory 1006 and the non-volatile storage 1008 respectively. The functions of these component elements are as has been described above.

Figure 11:
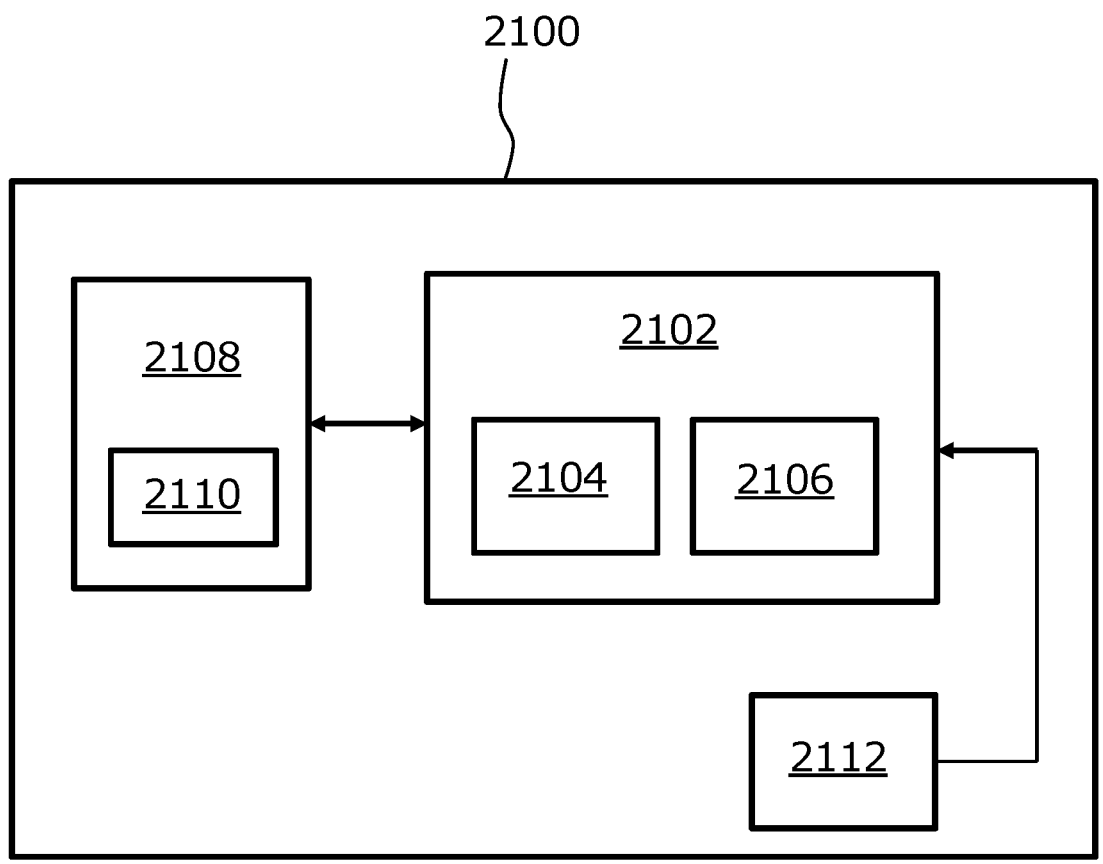
FIG. 11 is a schematic illustration of a system according to an embodiment of the present disclosure.

FIG. 11 is a schematic illustration of a system 2100 according to an embodiment of the present disclosure. The system 2100 comprises a computing arrangement 2102, a storage medium 2108 and an input interface 2112. The computing arrangement 2102 comprises a processor 2104 and a memory 2106. The storage medium 2108 comprises a database 2110. The function of these parts has been described above.

Figure 12:
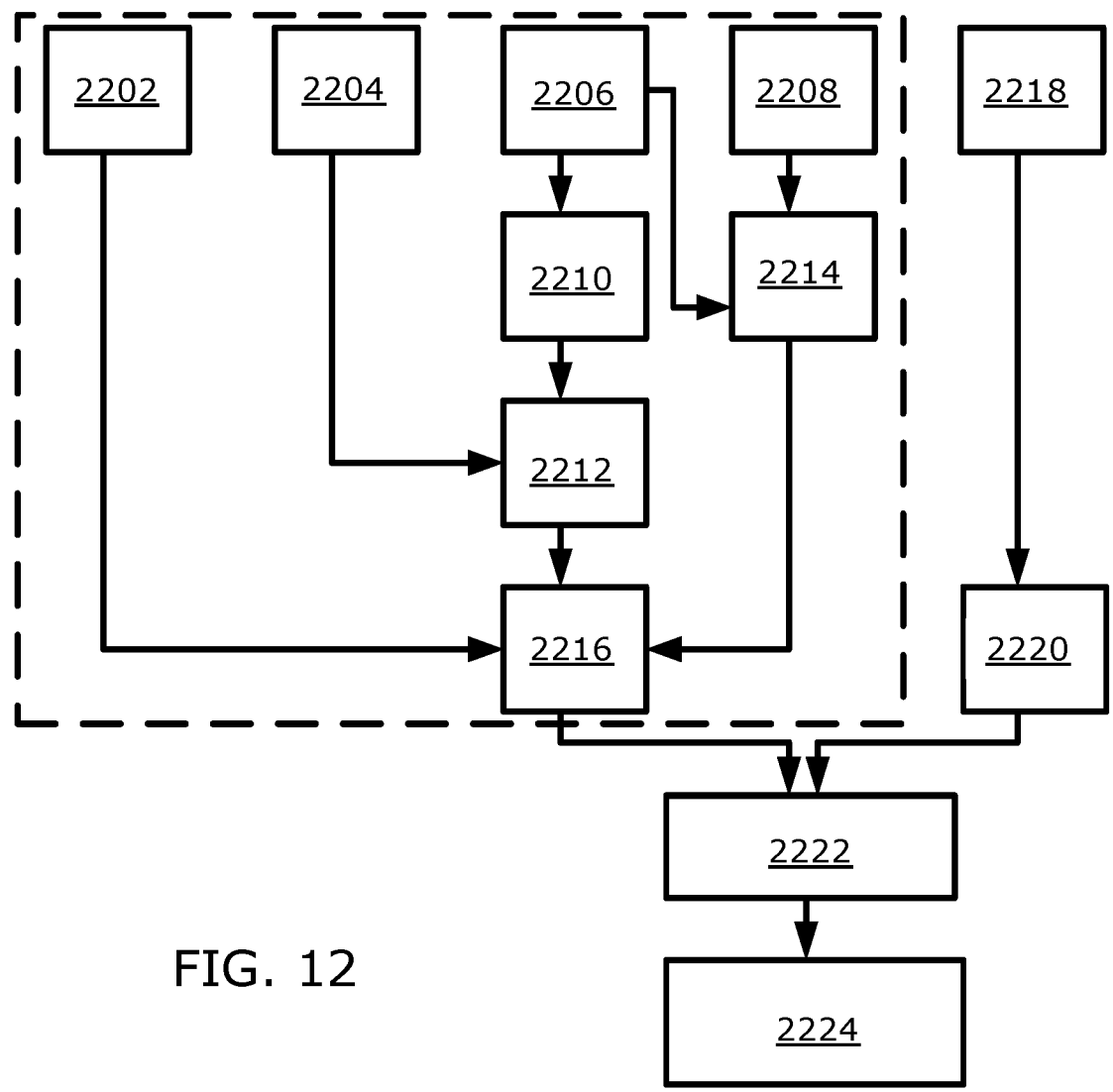
FIG. 12 is a schematic illustration of a flowchart including steps of a method for (of) training a weather prediction model to predict an ice water content risk of at least one aircraft flight in accordance with an embodiment of the present disclosure.

FIG. 12 is a schematic illustration of a flowchart including steps of a method for (of) training a weather prediction model to predict an ice water content risk of at least one aircraft flight in accordance with an embodiment of the present disclosure. At a step 2202, one or more input variables that include a pressure, an altitude, a trajectory or a location are obtained. At a step 2204, datasets of ice water contents present in an atmosphere with respect to a latitude, a longitude, an elevation, and a time is obtained. At a step 2206, aircraft flight history is obtained from a historical database. At a step 2208, historical ice water contents and at least one flight trajectory are obtained from a historical database. At a step 2210, at least one measure of historical ice water contents for a set of training data by retrieving datasets of atmospheric ice water contents at a location, an altitude and a time in proximity to the at least one trajectory of the at least one aircraft flight in aircraft flight plan data are determined from the historical database. At a step 2212, a measure of ice water content for the at least one aircraft flight is determined in real-time by retrieving the datasets of ice water contents at a location and a time in proximity to the at least one aircraft flight. At a step 2214, the aircraft engine run time, cycles and hours are determined from assignment data of engines to the aircraft, engine service data, and the aircraft flight history. At a step 2216, inputs such as the historical ice water contents and the datasets and the engine service data and the one or more input variables are provided to a weather prediction model. At a step 2218, engine health and engine life data are derived from maintenance records of the at least one aircraft flight. At a step 2220, output variables are selected for the aircraft engine. At a step 2222, the weather prediction model is trained using machine learning. At a step 2224, an ice water contents risk or a status report (or both) of the at least one aircraft flight is determined using the weather prediction model.

Figure 13:
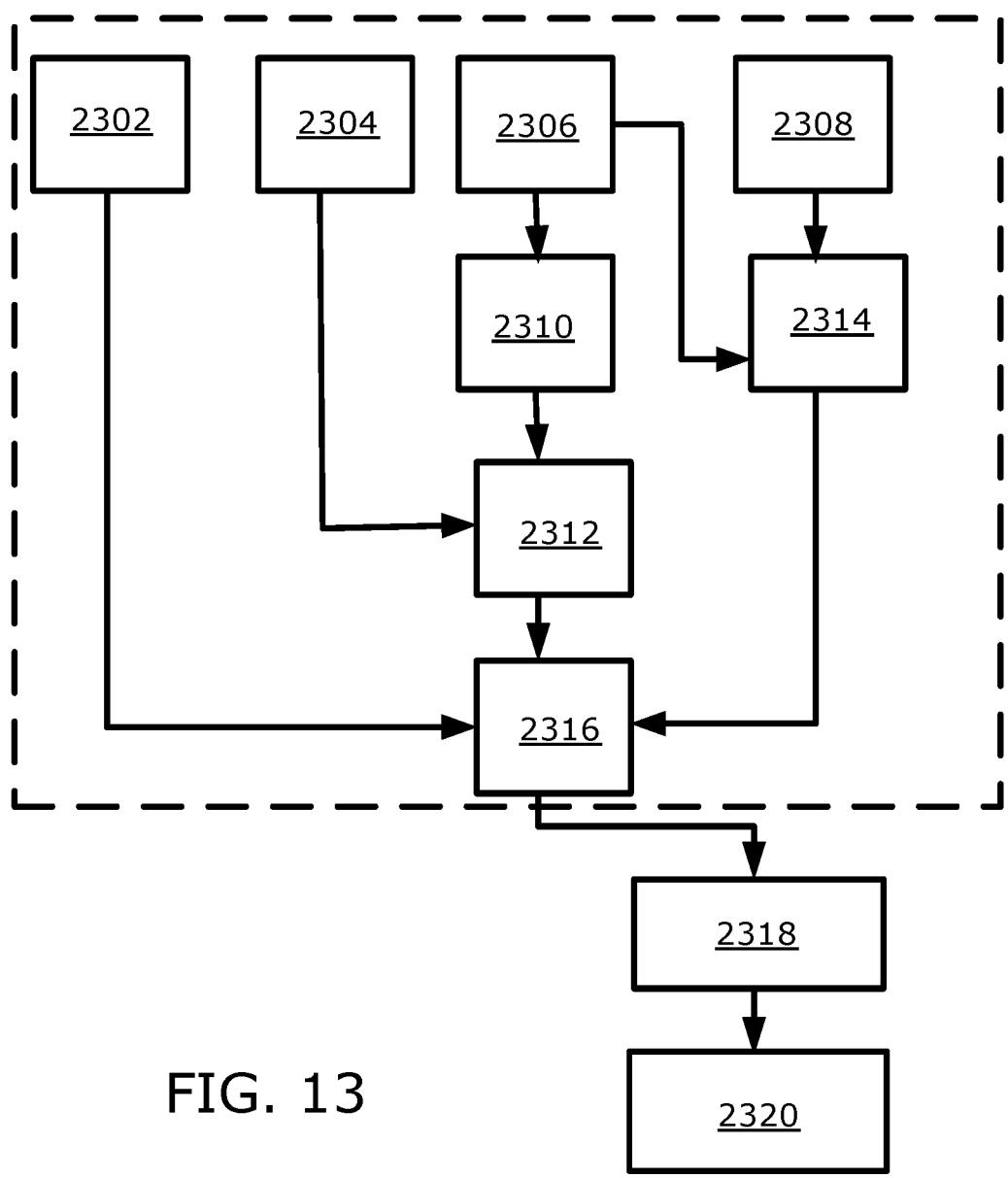
FIG. 13 is a schematic illustration of a flowchart including steps of a method for (of) predicting an ice water content risk of at least one aircraft flight using a weather prediction model in accordance with an embodiment of the present disclosure.

FIG. 13 is a schematic illustration of a flowchart including steps of a method for (of) predicting an ice water content risk of at least one aircraft flight using a weather prediction model in accordance with an embodiment of the present disclosure. At a step 2302, one or more input variables are obtained. At a step 2304, datasets of ice water contents present in an atmosphere with respect to a latitude, a longitude, an elevation, and a time is obtained. At a step 2306, aircraft flight history is obtained from a historical database. At a step 2308, assignment data of engines to the at least one aircraft and engine service data are obtained. At a step 2310, historical ice water contents are obtained from the historical database. At a step 2312, a measure of the ice water content for the at least one aircraft flight is determined in real-time by retrieving the datasets of ice water contents at a location and a time in proximity to the at least one aircraft flight. At a step 2314, the aircraft engine run time, cycles and hours are determined from assignment data of engines to the at least one aircraft flight and the engine service data and the at least one aircraft flight history. At a step 2316, inputs such as the historical ice water contents and the datasets and the engine service data and the one or more input variables are provided to a weather prediction model. At a step 2318, an ice water contents risk or a status report (or both) of the at least one aircraft flight is predicted based on the inputs. At a step 2320, at least one flight trajectory is adjusted to ensure the ice water content risk or the status report of the at least one aircraft flight is below a threshold value.

Figure 14:
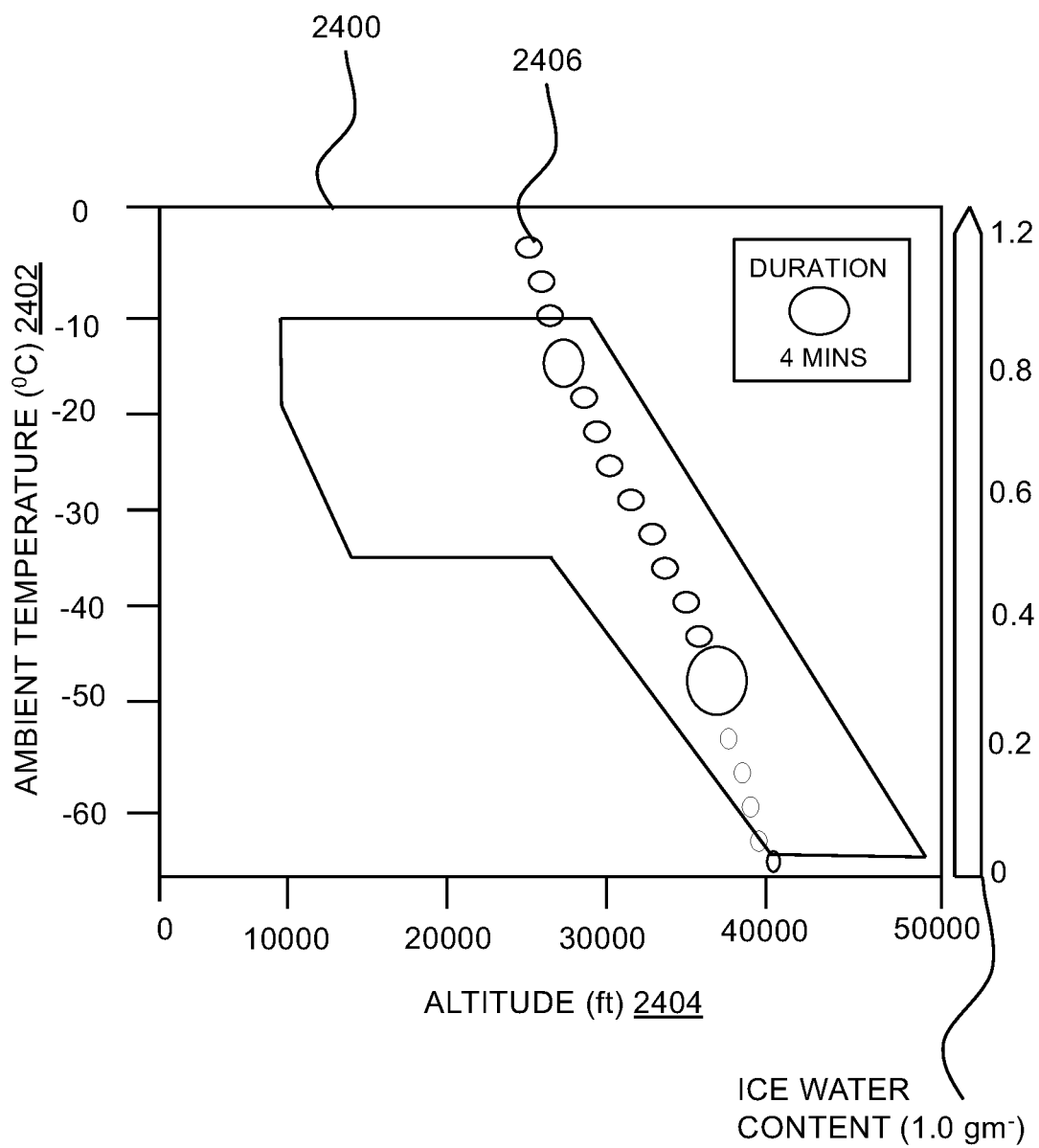
FIG. 14 is a graphical illustration that depicts ice water content exposure of an aircraft predicted using a weather prediction model with respect to altitude and ambient temperature in accordance with an embodiment of the present disclosure.

FIG. 14 is a graphical illustration 2400 that depicts ice water content exposure of an aircraft predicted using a weather prediction model with respect to altitude 2404 and ambient temperature 2402 in accordance with an embodiment of the present disclosure. The graphical illustration 2400 comprises a Y-axis plotted with an ambient temperature (° C.) 2402 versus an X-axis of an altitude (ft) 2404. The weather prediction model 404 forecasts and determines a risk or a status report (or both) of the at least one aircraft flight's encounter with ice water contents. The risk or the status report (or both) of at least one aircraft flight's encounter with the ice water contents is transmitted into an electronic flight bag (and/or to an airline or a flight dispatcher) in order to improve aircraft flight planning.

The weather prediction model is used to determine the risk or the status report of the at least one aircraft flight's encounter with the ice water contents and the risk or the status report (or both) of the at least one aircraft flight's encounter with the ice water contents is then plotted on top of an existing icing envelope. For example, a modelled mean ice water content throughout an atmospheric column is plotted for a portion of the at least one aircraft flight.

In an embodiment, dots 2406 indicate a mean ice water content for an altitude, while a size of the dots 2406 indicate a total time of the at least one aircraft flight spent at the altitude. In the existing icing envelope, a temperature-pressure point is plotted (no size, no colour, and no determination of actual risk). The plot confirms that, for a majority of duration of the flight, the aircraft flight is exposed to the mean ice water content of less than 0.8 gram per metre cube ($gm^{-3}$) regardless of an altitude in which the at least one aircraft flight flew at. In an example, the risk to icing is high, which may be determined using the weather prediction model. Detection of the risk to icing for the at least one aircraft flight in real-time enables the pilots to exit and avoid an icing environment.

Figure 15:
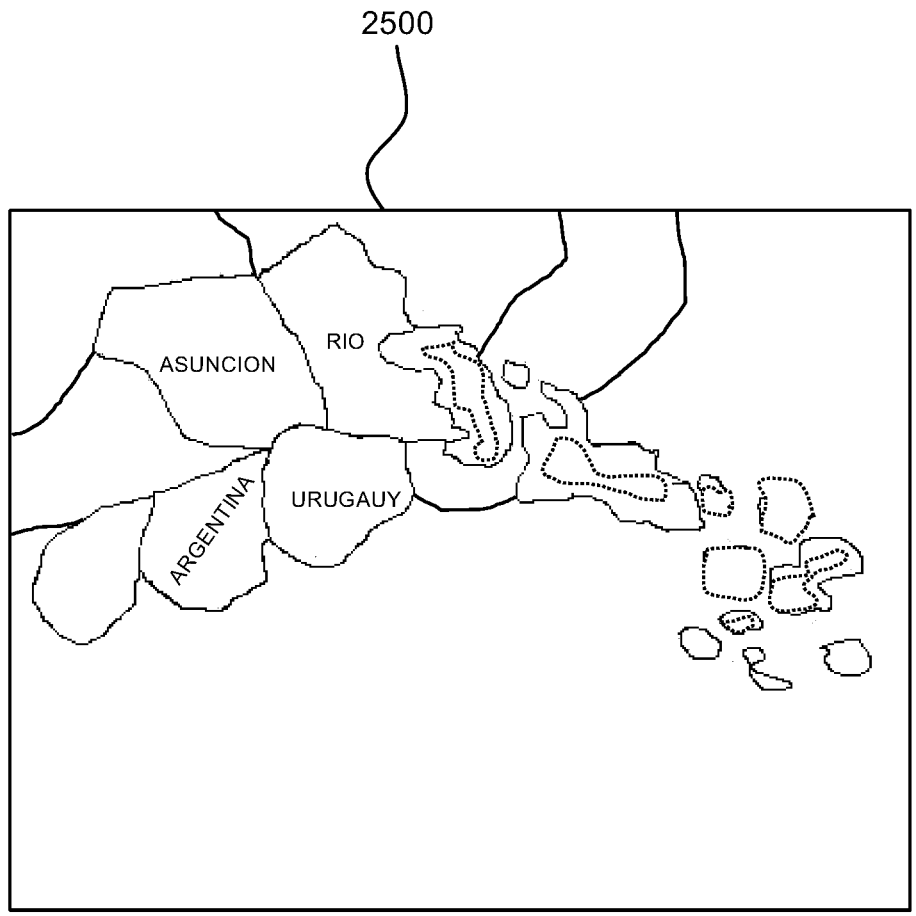
FIG. 15 is a schematic illustration of a spatial risk analysis using a traffic light approach in accordance with an embodiment of the present disclosure.

FIG. 15 is a schematic illustration of a spatial risk analysis 2500 using a traffic light approach in accordance with an embodiment of the present disclosure. The schematic illustration shows the spatial risk analysis 2500 using dotted lines "do not enter" and "try to avoid" traffic light approach.

Figure 16A:
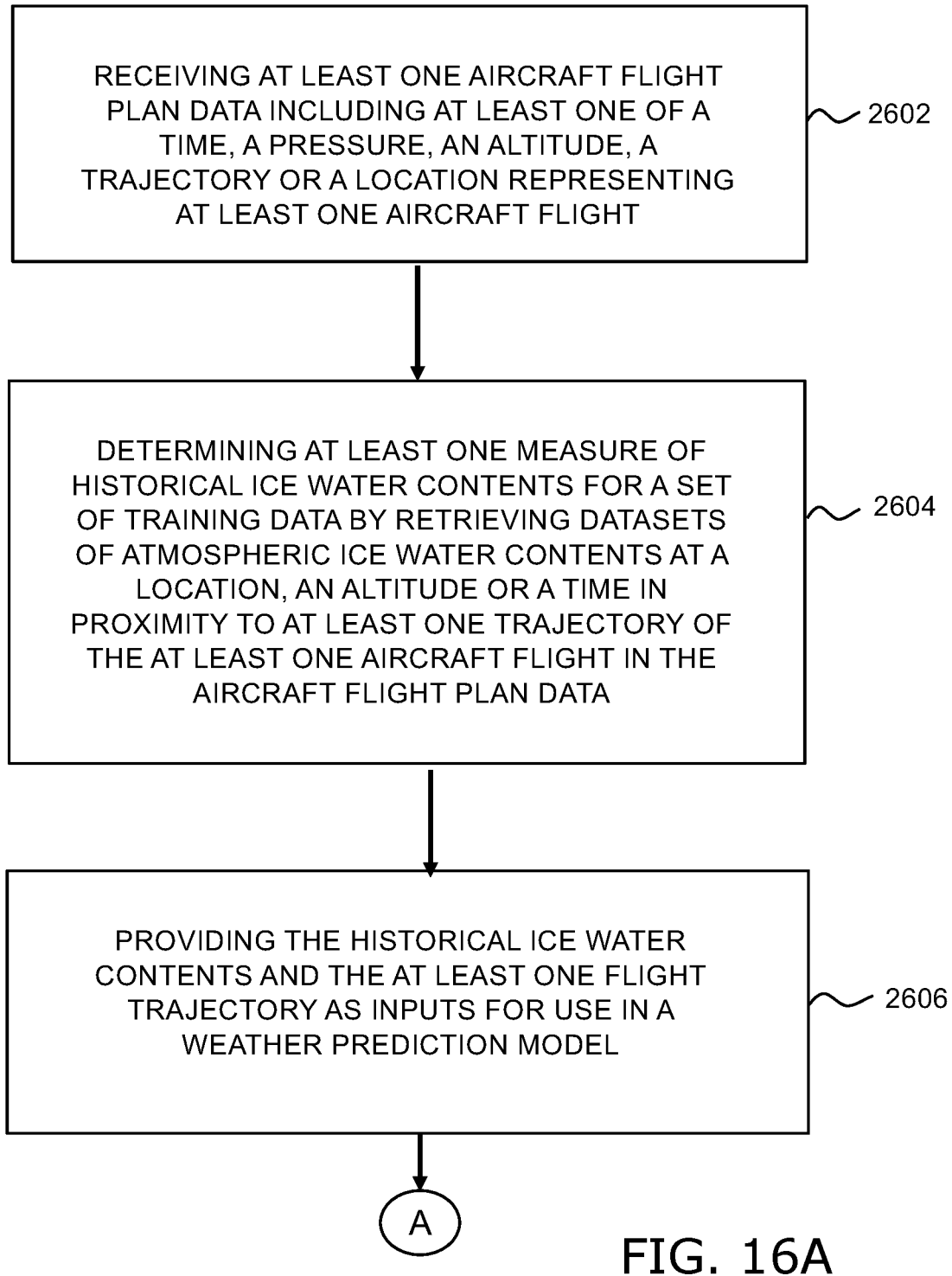
FIGS. 16A to 16B are schematic illustrations of flow diagrams of a method for (of) using a computing arrangement for aircraft flight planning in accordance with an embodiment of the present disclosure.
Figure 16B:
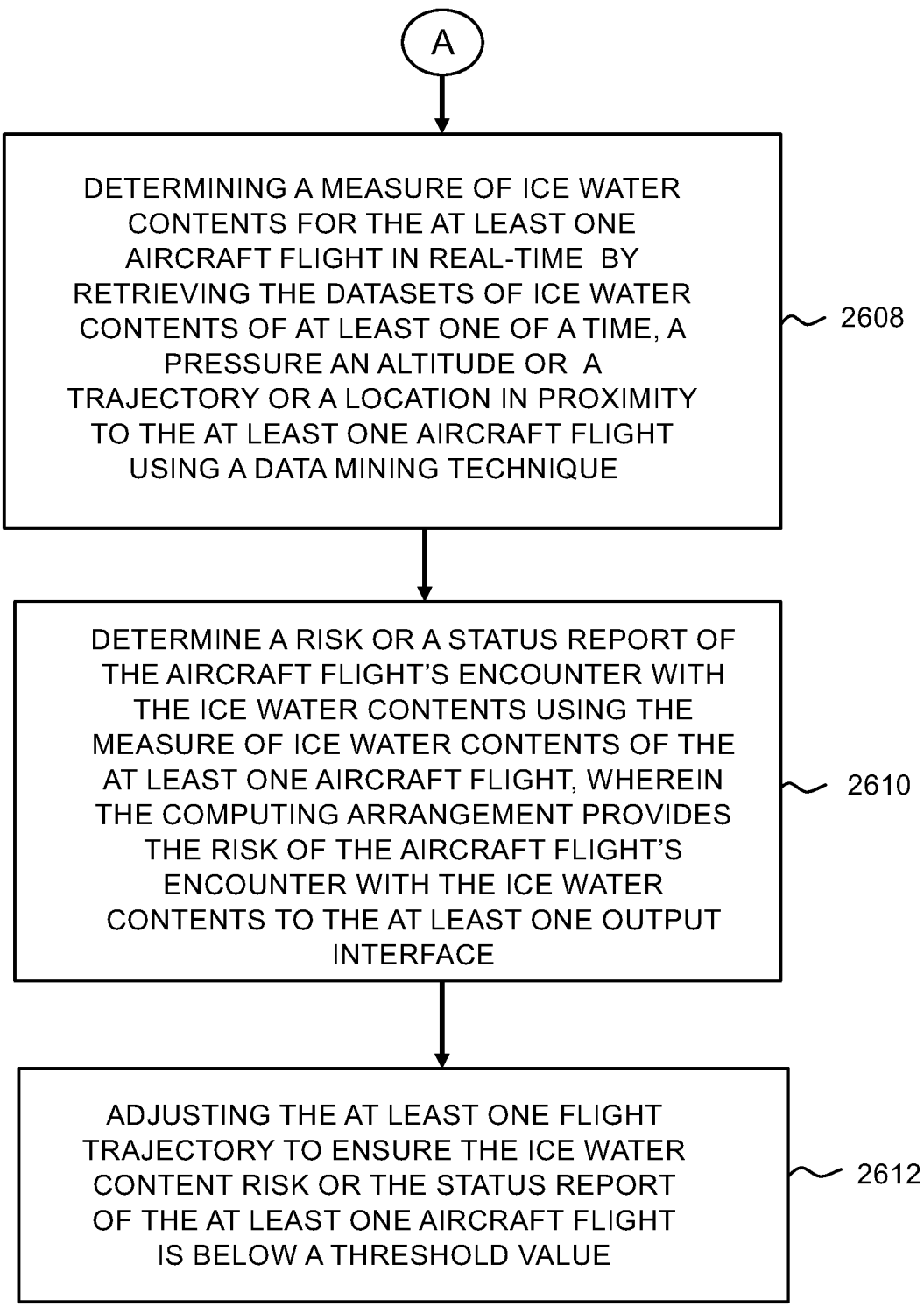

FIGS. 16A to 16B are schematic illustrations of flow diagrams of a method for (of) using a computing arrangement for aircraft flight planning in accordance with an embodiment of the present disclosure. At a step 2602, at least one aircraft flight plan data including at least one of a time, a pressure, an altitude, a trajectory or a location representing of at least one aircraft flight is received. At a step 2604, at least one measure of historical ice water contents for a set of training data is determined by retrieving datasets of atmospheric ice water contents at a location, an altitude or a time in proximity to at least one trajectory of the at least one aircraft flight in the aircraft flight plan data. At a step 2606, the historical ice water contents and the at least one flight trajectory is provided as inputs for use in a weather prediction model. At a step 2608, a measure of ice water contents is determined for the at least one aircraft flight in real-time by retrieving the datasets of ice water contents of at least one of a time, a pressure, an altitude or a trajectory and a location in proximity to the at least one aircraft flight using a data mining technique. At a step 2610, a risk or a status report (or both) of the aircraft flight's encounter with the ice water contents is determined using the measure of ice water contents of the at least one aircraft flight. The computing arrangement provides the risk or the status report of the aircraft flight's encounter with the ice water contents to the at least one output interface. At a step 2612, the at least one flight trajectory is adjusted to ensure the ice water content risk or the status report of the at least one aircraft flight is below a threshold value.

Figure 17:
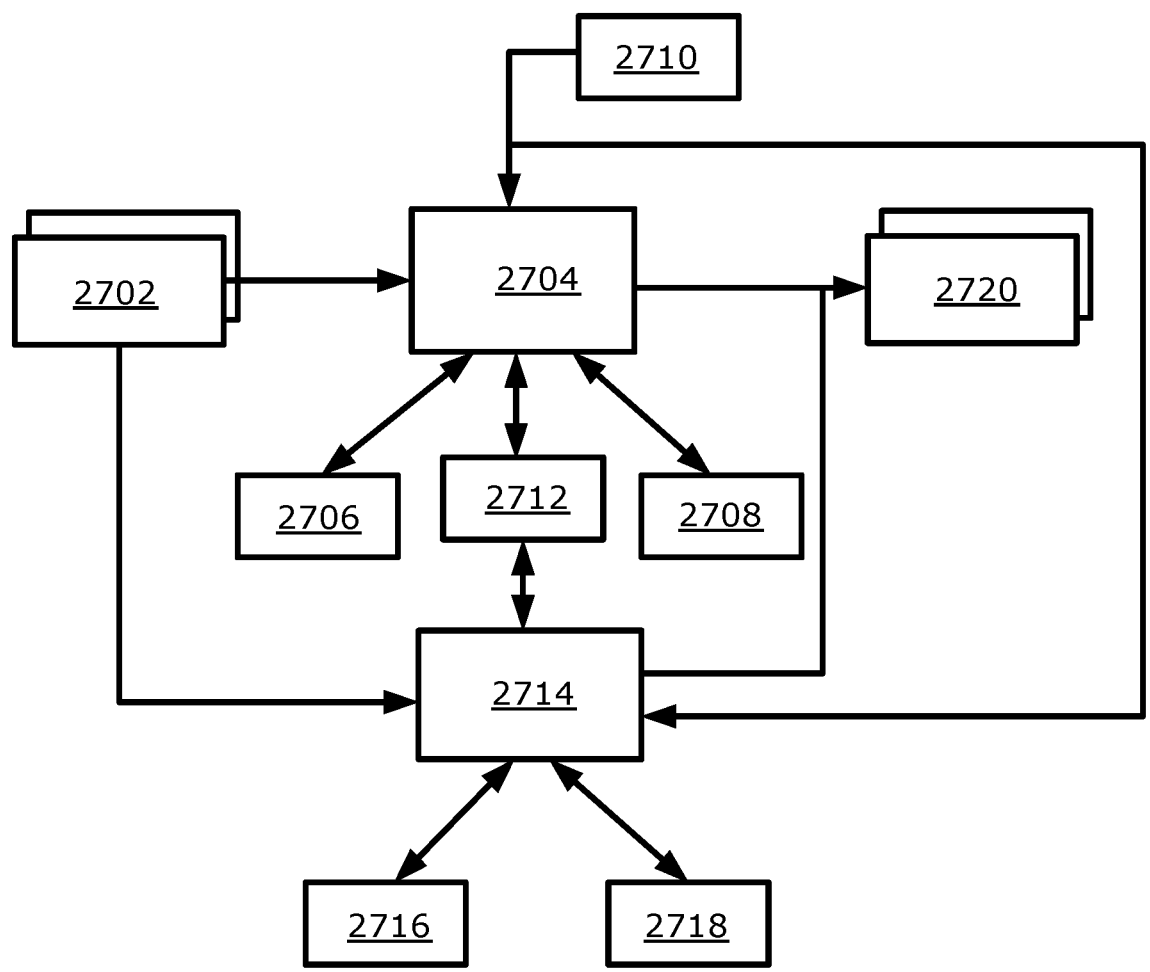
FIG. 17 is an illustration of an exploded view of a distributed computing system or cloud computing implementation in accordance with an embodiment of the present disclosure.

FIG. 17 is an illustration of an exploded view of a distributed computing system or cloud computing implementation in accordance with an embodiment of the present disclosure. The exploded view comprises an input interface 2702, a control module that comprises a processor 2704, a memory 2706 and a non-volatile storage 2708, processing instructions 2710, a shared/distributed storage 2712, a server that comprises a server processor 2714, a server memory 2716 and a server non-volatile storage 2718 and an output interface 2720. The function of the server processor 2714, the server memory 2716 and the server non-volatile storage 2718 are thus identical to the processor 2704, the memory 2706 and the non-volatile storage 2708 respectively. The functions of these parts are as has been described above.

In embodiments of the disclosure as described in the foregoing, for example where machine learning is employed, it will be appreciated that an estimate of atmospheric contaminant risk is beneficially computed by employing at least one of: a statistical model, a regression model, a machine learning model; at least one historical or present ("live") data set of atmospheric contaminant data is beneficially employed. Moreover, the statistical model or machine learning model is calibrated, trained or optimized by using the at least one historical or present ("live") data set of atmospheric contaminant data or simulations of atmospheric contaminant risk. For example, a statistic method is used to estimate a risk that atmospheric contamination may pose to a given aircraft or aircraft engine. For example, the risk can be calculated using Bayes' theorem as a statistical method:

A represents a contaminant risk,
B represents contaminant estimates from an NWP model,
p(A) represents prior knowledge of contaminant risk, and
p(B) represents statistical uncertainty relating the location, height or time position of a weather event,
wherein the risk in the presence of contaminants is susceptible to being estimated using Bayes' theorem by using:

$$p(A|B)=p(B|A)*p(A)/p(B).p(A)$$

by marginalisation of p(A|B), while p(B|A) and determined by comparison of estimated contaminants from similar NWP models that are evaluated using historical data representative of the respective contaminants over regions where one or more aircraft were known to be affected by adverse weather events.

Historical data potentially comprises contaminant mixing ratios, concentrations or integrated amounts estimated using NWP models, or measurements from, radiosondes, ground-based sensors, sensors mounted on aircraft, for events or time points in the past. Moreover, present ("live") atmospheric contaminant data beneficially comprises contaminant mixing ratios, concentrations or integrated amounts estimated using NWP models, or measurements from, radiosondes, ground-based sensors, sensors mounted on aircraft, for times within 24 hours before or after the flight, and beneficially use most recent data that is available. Moreover, a statistical method optionally also comprises a method that estimates at least one probability density, histogram or statistical distribution parameter related to a mean, standard deviation, variance or kurtosis of a distribution of a contaminant, and then uses such at least one parameter to determine a measure indicative of the risk, probability or likelihood that an atmospheric contaminant is potentially present at levels (i.e. volumetric concentrations) above at least one threshold, by comparison with the cumulative distribution function of the contaminant's probability density function associated with the at least one parameter.

It will be appreciated that embodiments of the present disclosure benefit from consideration of spatial or temporal uncertainty. Such consideration is achievable by considering estimated values of a contaminant at multiple spatial points in proximity in location, height or time in the vicinity of a waypoint. Optionally, such values have associated therewith a probability density function. Alternatively, a probability density function, or a parameter such as a standard deviation of a probability density function, is optionally estimated from the multiple points. A risk is calculated for each point in proximity. The overall risk is determinable from the maximum risk, wherein the maximum risk is optionally weighted by the probability density function.

Beneficially, embodiments of the present disclosure employ a numerical model, including a regression model or a machine learning model including without limitation a linear regression, logistic regression, decision tree, random forest, support vector machine, Gaussian process or neural network; the numerical model is beneficially used to estimate atmospheric contaminant risk. The numerical model's coefficients are optionally hand-tuned or trained using a machine learning process.

Beneficially, embodiments of the present disclosure employ a numerical model to estimate a target value, a target category, a probability associated with at least one target value or category, or an uncertainty parameter including a standard deviation, variance or covariance matrix.

Models employed in embodiments of the present disclosure are beneficially trained using historical data of measurements of a contaminant at a plurality of spatial locations and at times in the past, for example as aforementioned. Spatial locations and times are determinable from waypoints or from the use of global satellite navigation systems. Measurements are obtainable using various sensing apparatus including ground-based sensors, aircraft-mounted sensors, satellite sensing, radiosondes. Loss of power or loss of flight control of aircraft (adverse events) and normal power or control (benign conditions and events) are beneficially also considered as measurements of high-risk conditions and normal conditions.

When using models of the present disclosure, measurements are used to derive at least one target value for the model to predict. Values obtained from a NWP model of the contaminant and of other relevant parameters (which optionally include temperature, pressure, altitude, wind speed, flight speed) in the vicinity (in time, altitude or location) of the measurement are beneficially used as features for the models. Derived features are calculable using methods of machine learning, including smoothing, averaging, operations including mean, maximum and standard deviation. Optionally, features are normalised, using normalization weighting as described in the foregoing. Features are also determinable from other sources of atmospheric data, including without limitation, ground-based sensors, aircraft-mounted sensors, satellite sensing, radiosondes. Beneficially, features are indicative of the target atmospheric contaminant and of the physical processes that transport it or influence its risk to an aircraft.

Aforementioned models are beneficially trained using corresponding sets of features and targets using methods employed for machine learning. The estimated target value, and any associated probability or uncertainty parameter, is beneficially used to determine an atmospheric contaminant risk as described in the foregoing.

After training, the model is then applied to features similarly determined from historical data or present ("live") data, to provide a measure of atmospheric contaminant risk at corresponding spatial locations and times. Live data may include recent measurements, recent forecasts, nowcasts and other ground-based sensors, aircraft-mounted sensors, satellite sensing, radiosondes, beneficially within 24 hours and beneficially as close in location and time to a waypoint of interest. A probability or uncertainty parameter determined by a model beneficially provides a measure of spatial or temporal uncertainty.

An overall risk for a flight or when traversing a given region is optionally determinable by combining an estimated atmospheric contaminant risk from two or more waypoints using at least one of the following operations: mean, maximum, Lp-norm.

Beneficially, an index of risk is determinable by comparing an atmospheric contaminant risk (including a probability distribution or value) with a pre-determined scale. Beneficially, values of an index of risk are determinable by comparing at atmospheric pressure with at least one threshold. For example, an index of 1 corresponds to very low risk and to ice water content values below 0.01 $g/m^3$, and index of 2, with a higher risk, to values in a range of 0.01 to 0.1 $g/m^3$, an index of 3 to values in a range of 0.1 to 1 $g/m^3$, and so on. An index of risk is beneficially used to represent an atmospheric contaminant risk.

When presenting atmospheric contaminant risk at the output interface, the system beneficially identifies at least one section of the flight plan with a highest risk or where a risk exceeds a threshold.

Next, embodiments of the present disclosure, as described above, methods of recommending flight plan variants will be considered, for example where aircraft trajectory re-routing is recommended. When making recommendations for flight plan variants, a computing arrangement of a system further comprises a database of at least one of aircraft flight plan variables or air traffic constraints, wherein in operation the computing arrangement calculates at least one modified aircraft flight plan for the at least one aircraft flight based on the at least one of aircraft flight plan variables or air traffic constraints, and generates an estimated atmospheric contamination risk for the modified aircraft flight plan for comparison with the estimated atmospheric contamination risk for the at least one aircraft flight.

The resultant indication related to the estimated atmospheric contamination risk provided via the output interface comprises at least one of: an index of the risk of atmospheric contamination associated with an aircraft flight; a recommendation on modification of at least one aircraft flight plan to mitigate or reduce atmospheric contamination exposure; an indication of portions of the aircraft flight where risk of exposure exceeds a threshold.

Beneficially, the method further comprises using the measure of at least one atmospheric contaminant to calculate at least one estimate of the atmospheric contaminant risk in the vicinity of a modified flight plan and adjusting the flight plan by performing a comparison of a plurality of estimated atmospheric contamination risk associated with each of the modified flight plan and the flight plan.

Beneficially, the method further comprises applying an optimisation to reduce the atmospheric contamination risk versus at least one cost metric associated with alternate flight plan.

Beneficially, when the process determines that an unacceptable risk potentially pertains for a given flight plan, the method presents an alternative flight plan having a lower risk. By reference to air traffic control constraints such as approved corridors, historical flights of other aircraft in a region, at least one candidate alternative flight plan is determinable using flight planning methods, for example known contemporary flight planning methods.

Thus, the methods described in the foregoing are susceptible to being used to determine an atmospheric contaminant risk associated with the at least one alternative flight plan. When an alternative flight plan is considered to offer lower atmospheric contaminant risk, it is beneficially recommended as a possible modification.

Models of the present disclosure, as described in the foregoing, beneficially employ a cost function that optionally includes or combines one or more of estimated cost associated with a flight plan, a differential cost from another flight plan, an estimated duration, a differential duration, an atmospheric contaminant risk. Such a cost function optionally weight each cost input with a mutually different weight representative of their relative magnitude. Moreover, such a cost function beneficially allows the system or flight planners to compare alternative strategies, taking into account that increases in flight duration or cost are potentially acceptable if they provide a lower atmospheric contaminant risk.

Embodiments of the disclosure described in the foregoing are implemented using a computing arrangement, wherein the computing arrangement beneficially receives aircraft flight plan data from the input interface; wherein the at least one aircraft flight plan data includes at least one of a time, a pressure or an altitude, a trajectory and a location representing at least one aircraft flight. Optionally, the flight plan includes take-off and landing airports and a trajectory defined by a list of waypoints defined by expected time, latitude, longitude, altitude.

When only the takeoff and landing airports are provided, a trajectory is estimable using numerical methods, for example by preparing a typical trajectory between the two airports representative of one or more previous paths taken by a given aircraft.

Optionally, a trajectory includes only of one point or a sequence of points representing a part of a flight path of interest for a given aircraft, for example to traverse a region known to be subject to adverse weather conditions. In such an example, the system optionally processes risk only for the part of the flight path of interest for a given aircraft.

Where time data is not otherwise provided, synthesized time data determinable from the scheduled departure or arrival time of a flight. Where only one time is provided, times of each waypoints are determinable iteratively from another known waypoint in turn by dividing a distance between the two waypoints by an aircraft's typical speed during that part of the flight.

In embodiments of the disclosure described in the foregoing, it is convenient that waypoints are known on a similar grid to a numerical weather prediction (NWP) model. Where waypoints are widely separated, they are susceptible to being interpolated or extrapolated, for example on a straight line basis, so that spatial locations are sampled with resolution approximating that of the NWP model.

From the foregoing, it will be appreciated that the estimated atmospheric contamination risk is determined using a measure of at least one atmospheric contaminant for the at least one aircraft flight based upon a location, an altitude or pressure, a trajectory and a time information extracted from the at least one aircraft flight plan data. Beneficially, an NWP model is arranged to compute the concentration or mixing ratio of a contaminant at a plurality of locations, heights and times in proximity to the flight, using methods known in the art such as the WRF and ECMWF models. At one or more waypoints, the computing arrangement beneficially determines an atmospheric contaminant risk by querying the results of an NWP model for that location, time and height to determine a concentration of a contaminant. For example, the NWP model defines the concentration or mixing ratio of ice water, dust, sulphate, sulphur dioxide or sodium chloride. Where the NWP model defines a mixing ratio (for example, in kg of contaminant per kg of air), the concentration is derivable by multiplying the mixing ratio by the density of air at the temperature and pressure estimated at the respective location, time and height.

Where locations, heights or times in the NWP model do not correspond exactly to a waypoint, the closest location, height or time is optionally determined and used to query the NWP model results. Alternatively, interpolation such as linear or bicubic interpolation is used to interpolate the NWP model mixing ratio or concentration at the waypoint.

Next, "risk" as a parameter in embodiments of the disclosure described in the foregoing will be elucidated in greater detail. The expected concentration of a contaminant is optionally used directly when computing a risk. For example, it is known that ice water content poses a particular hazard to aircraft and its concentration is susceptible to being presented to user in embodiments of the present disclosure. Optionally, a threshold is susceptible to being applied to determine a risk. For example, if ice water content exceeds 1 gram per cubic metre, it is potentially considered to pose an unacceptable hazard and therefore will be highlighted as a risk. A pre-determined relationship is optionally used to relate a concentration of a contaminant to a risk. For example, the risk is 10% at a contaminant concentration of 0.1 g/m$^3$, the risk is 30% at a contaminant concentration of 1.0 g/m$^3$, and the risk is 100% at a contaminant concentration of 3 g/m$^3$. Intermediate risk values may be determined by interpolation.

Next, it will be appreciated that embodiments of the disclosure described in the foregoing include a computing arrangement that computes at least one of spatial or temporal uncertainty to derive the indication related to the estimated atmospheric contamination risk. Optionally, a measure of uncertainty is beneficially calculated or derived for the waypoint or closest NWP result location. Moreover, a measure of uncertainty may be estimated by the NWP model by Monte Carlo modelling as known in the art. Moreover, a measure of uncertainty is optionally a value for a particular waypoint or location, or is optionally beneficially averaged or smoothed in respect of regions, heights or times, for example using a Gaussian convolution, to reflect that an estimation of the measure of uncertainty is potentially itself stochastically noisy.

Beneficially, in embodiments of the present disclosure, a probability density function is determined representative of the contaminant density or mixing ratio. By comparing with the probably density function, an estimated concentration and uncertainty is used to determine at least one risk. For example, given an estimated ice water content, a standard deviation of the estimate determined from the measure of spatial or temporal uncertainty, and that the estimation error is considered to follow a Normal distribution, the probability that atmospheric contaminant density at a location potentially exceeds a threshold that is determinable and usable as a measure of the risk. For example, the risk that they contaminant exceeds 1 g/m$^3$ is beneficially presented at the output interface together with its respective location or waypoint.

It is known in the art of NWP that models potentially make errors in locating an event such as a storm or dust storm in space or time. Known methods of NWP estimate a magnitude of such errors, for example by estimating cloud visibility as seen from space and by comparing with satellite images of corresponding events. An uncertainty, namely potential error, is susceptible to vary as a function of time or spatial location. Temporal and spatial uncertainty are related, as is known in the art of Kalman filtering, and thus are potentially interchangeable, for example by considering the speed of movement of a weather event or the underlying wind speed. In the present disclosure, spatial uncertainty is optionally defined by at least one standard deviation. By multiplying by a Gaussian function, this spatial uncertainty is converted to a probability density function sampled over space that is representative of a spatial normal distribution.

When a spatial or a temporal uncertainty is defined over a region (optionally, by a probability density function), a contaminant's uncertainty or distribution is susceptible to being estimated at a location using statistical methods. For example, the NWP results pertaining to the region are susceptible to being considered as an ensemble of samples (optionally, with likelihood determined from the probability density function). The proportion of samples that exceed at least one threshold is susceptible to being considered to approximate the risk (optionally, weighted using the probability density function), providing a beneficial method to estimate the risk, as a probability, that the contaminant exceeds each threshold in the approximate location.

Embodiments of the present disclosure beneficially utilize an aircraft anti-icing system, comprising:
a computing arrangement including at least one input interface, a processor and at least one output interface; and
an anti-icing apparatus communicatively coupled to the output interface;
wherein the input interface is adapted to receive an ice water content data value, and to transmit the ice water content data value to the processor, and
wherein the processor is adapted to compare the ice water content data value to a minimum threshold value in order to determine if the ice water content data value is above the minimum threshold value, and to turn the anti-icing apparatus on when it is determined that the ice water content data value is above the minimum threshold value, and to turn the anti-icing apparatus off when it is determined that the ice water content data value is below the minimum threshold value.

The aircraft anti-icing system is optionally employed in combination with the aforementioned aircraft flight control system. Alternatively, the aircraft anti-icing system can be used independently of the aircraft flight control system. Operating the ant-icing apparatus is expensive in terms of energy consumption and wear-and-tear, so selective use of the anti-icing apparatus pursuant to the present disclosure is especially beneficial.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An aircraft flight control system, comprising:
a computing arrangement including an input interface and an output interface, wherein in operation the computing arrangement executes instructions to provide indications related to an estimated atmospheric contamination risk to at least one aircraft at selected locations and altitudes or pressures, by:
(i) receiving at least one aircraft flight plan data from the input interface, wherein at least one aircraft flight plan data includes at least one of time, a pressure or an altitude, a trajectory and a location representing at least one aircraft flight;
(ii) determining the estimated atmospheric contamination risk using a measure of the at least one atmospheric contaminant for the at least one aircraft flight based upon a location, an altitude or pressure, a trajectory and a time information extracted from the at least one aircraft flight plan data; and
(iii) providing, via the output interface, a resultant indication related to the estimated atmospheric contamination risk to the at least one aircraft, wherein the estimated atmospheric contamination risk is calculated by using a machine learning model utilising at least one of historical or live atmospheric contaminant data, and wherein the machine learning model is calibrated, trained or optimised using at least one of historical atmospheric contaminant data, live atmospheric contaminant data or simulations of the atmospheric contaminant risk, wherein the aircraft flight control system is configured to automatically adopt a modified flight plan having lower atmospheric contamination risk based on the resultant indication.

2. The aircraft flight control system of claim 1, wherein, when in operation, the computing arrangement incorporates a calculation of at least one of spatial or temporal uncertainty to derive the indication related to the estimated atmospheric contamination risk.

3. The aircraft flight control system of claim 1, wherein the computing arrangement further comprises a database of at least one of aircraft flight plan variables or air traffic constraints, wherein in operation the computing arrangement calculates at least one modified aircraft flight plan for the at least one aircraft flight based on at least one of aircraft flight plan variables or air traffic constraints, and generates an estimated atmospheric contamination risk for the modified aircraft flight plan for comparison with the estimated atmospheric contamination risk of at least one aircraft flight plan.

4. The aircraft flight control system of claim 1, wherein further variables are received by the input interface and utilized by the computing arrangement to iterate the measure of at least one atmospheric contaminant with the further variables to provide the estimated atmospheric contamination risk, wherein said further variables including one or more of: engine or aircraft control, loading or operational parameters, engine or aircraft model and type information, sensor data, weather parameters, temperatures, speeds, altitudes, mass flow rates, fuel flow rates, vibration measures, inspection results and wear estimates, and wherein the measure of at least one atmospheric contaminant is iterated by defining at least one boundary condition which represents at least one of a weather or atmospheric contaminant at a time.

5. A method of (for) controlling aircraft flight, wherein the method comprises:
providing a measure of at least one atmospheric contaminant with respect to a location, an altitude or a pressure, and a time;
receiving at least one aircraft flight plan data including at least one of a time, a pressure or an altitude, a trajectory and a location representing at least one aircraft flight;
calculating an estimate of the atmospheric contaminant risk for at least one flight plan using the measure of at least one atmospheric contaminant based upon a location, an altitude or pressure, a trajectory and a time information extracted from the at least one aircraft flight plan data; and
providing a resultant indication related to the estimate of atmospheric contamination risk to the at least one aircraft, wherein the measure of the at least one atmospheric contaminant is calculated by a machine learning model utilising at least one of historical or live atmospheric contaminant data, and wherein the machine learning model is calibrated, trained or optimised using at least one of historical atmospheric contaminant data, live atmospheric contaminant data or simulations of the atmospheric contaminant risk, wherein the method further comprises automatically adopting a modified flight plan having lower atmospheric contamination risk based on the resultant indication.

6. The method of claim 5, wherein the method utilizes a calculation of at least one of spatial or temporal uncertainty to derive the indication related to the estimated atmospheric contamination risk.

7. The method of (for) controlling aircraft flight of claim 5, wherein the at least one atmospheric contaminant comprises one or more of: dust, organic particles, volcanic ash, salt, sulphur dioxide and sulphate ions, and the estimated atmospheric contaminant risk comprises an exposure index indicative of the concentration or amount of atmospheric contaminants estimated to have passed through the aircraft engines.

8. The method of (for) controlling aircraft flight of claim 7, wherein the exposure index comprises a weighted total exposure to a plurality of atmospheric contaminants.

9. The method of (for) controlling aircraft flight of claim 5, wherein the method is performed as a Monte Carlo model to provide a probability, expectation or standard deviation for the forecast of the atmospheric contaminant risk.

10. The method of (for) controlling aircraft flight of claim 5, wherein the method further comprises post-processing the estimated atmospheric contaminant risk to apply at least one of a spatial or temporal uncertainty calculation.

11. The method of (for) controlling aircraft flight of claim 10, wherein the post-processing comprises deriving a spatially smoothed probability.

12. The method of (for) controlling aircraft flight of claim 11, wherein the post-processing comprises applying an approximation to Bayes' theorem.

13. The method of (for) controlling aircraft flight of claim 5, wherein the method further comprises applying an optimisation to reduce the atmospheric contamination risk versus at least one cost metric associated with alternate flight plan.

14. A computer program product comprising instructions to cause the system of claim 1 to carry out the method of claim 5.

15. The aircraft flight control system of claim 1, further comprising an aircraft anti-icing system comprising:
a computing arrangement including at least one input interface, a processor and at least one output interface; and
an anti-icing apparatus communicatively coupled to the output interface;
wherein the input interface is adapted to receive an ice water content data value, and to transmit the ice water content data value to the processor, and
wherein the processor is adapted to compare the ice water content data value to a minimum threshold value in order to determine if the ice water content data value is above the minimum threshold value, and to turn the anti-icing apparatus on when it is determined that the ice water content data value is above the minimum threshold value, and to turn the anti-icing apparatus off when it is determined that the ice water content data value is below the minimum threshold value.

16. The method of operating an aircraft anti-icing system of claim 15, using a computer arrangement comprising an input interface, a processor and an output interface coupled to an anti-icing apparatus, the method comprising:
receiving an ice water content data value;
determining whether the received ice water content data value is above a minimum threshold value; and turning on the anti-icing apparatus when it is determined that the received ice water content data value is above the minimum threshold value.

17. The method of claim 16 employed in combination with the method of claim 5.

\* \* \* \* \*